US006030549A

United States Patent [19]

Kalb et al.

[11] Patent Number: 6,030,549

[45] Date of Patent: Feb. 29, 2000

[54] DUPOLY PROCESS FOR TREATMENT OF DEPLETED URANIUM AND PRODUCTION OF BENEFICIAL END PRODUCTS

[75] Inventors: Paul D. Kalb, Wading River; Jay W. Adams, Stony Brook; Paul R. Lageraaen, Seaford, all of N.Y.; Carl R. Cooley, Gaithersburg, Md.

[73] Assignee: Brookhaven Science Associates, Upton, N.Y.

[21] Appl. No.: 08/910,502

[22] Filed: Aug. 4, 1997

[51] Int. Cl.[7] .............................. A62D 31/00; C09K 3/00; G21C 11/00; G21F 9/00

[52] U.S. Cl. ........................ 252/478; 252/625; 250/515.1; 588/6; 588/8

[58] Field of Search ...................................... 252/478, 625; 250/515.1; 588/6, 8

[56] References Cited

U.S. PATENT DOCUMENTS

| | | | |
|---|---|---|---|
| 3,883,749 | 5/1975 | Whittaker et al. . | |
| 4,119,560 | 10/1978 | Sheeline . | |
| 4,194,842 | 3/1980 | Puthawala | 252/625 |
| 4,230,597 | 10/1980 | Bustard et al. . | |
| 4,299,721 | 11/1981 | Hirand et al. | 252/478 |
| 4,708,822 | 11/1987 | Fukasawa et al. . | |
| 4,868,400 | 9/1989 | Barnhart et al. . | |
| 5,015,863 | 5/1991 | Takeshima et al. . | |
| 5,164,123 | 11/1992 | Goudy, Jr. . | |
| 5,334,847 | 8/1994 | Kronberg . | |
| 5,402,455 | 3/1995 | Angelo, II et al. . | |
| 5,471,065 | 11/1995 | Harrell et al. . | |
| 5,789,648 | 8/1998 | Roy et al. | 252/625 |

OTHER PUBLICATIONS

Fuchs et al., Journal of the Optical Society of America, vol. 58, No. 3, pp. 319–330, (Mar. 1968).

J.W. Adams and P.D. Kalb, "Thermoplastic Stabilization of Chloride, Sulfate, and Nitrate Saltes Mixed Waste Surrogate." *American Chemical Society,* I&EC Special Symposium, (Sep. 1994).

P.D. Kalb, P.R. Lageraaen, "Full–Scale Technology Demonstration of a Polyethylene Encapsulation Process for Radioactive, Hazardous, and Mixed Wastes," *Journal of Environmental Science and Health,* vol. A31, No. 7 (1996).

Bhavesh R. Patel, Paul R. Lageraaen, Paul D. Kalb, "Review of Potential Processing Techniques for the Encapsulation of Wastes in Thermoplastic Polymers," *BNL–62200,* Aug. 1995.

J.E. Hopf, "Conceptual Design Report for the Ducrete Spent Fuel Storage Cask System", INEL–95/0030, Feb. 1995.

*Primary Examiner*—Philip Tucker

*Attorney, Agent, or Firm*—Margaret C. Bogosian

[57] ABSTRACT

The present invention provides a process of encapsulating depleted uranium by forming a homogenous mixture of depleted uranium and molten virgin or recycled thermoplastic polymer into desired shapes. Separate streams of depleted uranium and virgin or recycled thermoplastic polymer are simultaneously subjected to heating and mixing conditions. The heating and mixing conditions are provided by a thermokinetic mixer, continuous mixer or an extruder and preferably by a thermokinetic mixer or continuous mixer followed by an extruder. The resulting DUPoly shapes can be molded into radiation shielding material or can be used as counter weights for use in airplanes, helicopters, ships, missiles, armor or projectiles.

27 Claims, 11 Drawing Sheets

Comparison of DUPoly Microencapsulation with the Projected Loading for a Hybrid DUPoly Micro/Macroencapsulation Technique as a Function of $UO_3$.

Projected Comparison of Loading Efficiency for $UO_2$ Based on Microencapsulation of $UO_3$.

Comparison of DUPoly Microencapsulation with the Projected Loading for a Hybrid DUPoly Micro/Macroencapsulation Technique as a Function of $UO_3$.

Comparison of DUPoly Microencapsulation with the Projected Loading for a Hybrid DUPoly Micro/Macroencapsulation Technique as a Function of $UO_2$.

Projected Comparison of DUPoly Microencapsulation ($UO_2$) with a Hybrid Micro/Macroencapsulation Technique using Sintered $UO_2$.

Projected Volumes of Equivalent Quantities of $UO_3$ for Various Processing Alternatives.

Differential Scanning Calorimeter Output (mW/mg vs. °C) for As-Received Batch and Continuous Process DU.

Bench-Scale Killion Plastics Extruder

DUPoly Density versus DU Loading for Samples Prepared from $UO_3$

Compressive Yield Strength versus DU Loading.

ALT leach Results for Batch Process DUPoly Samples

DUPOLY PROCESS FOR TREATMENT OF DEPLETED URANIUM AND PRODUCTION OF BENEFICIAL END PRODUCTS

This invention was made with Government support under contract number DE-AC02-76CH00016, awarded by the U.S. Department of Energy. The Government has certain rights in the invention.

BACKGROUND THE INVENTION

This invention provides a process for the encapsulation of depleted uranium (DU) and, in particular, for DU encapsulation in thermoplastics (DUPoly), such as polyethylene for secondary end-use applications and/or disposal.

Uranium is a naturally occurring radioactive element containing different isotopes, notably uranium-238 ($^{238}U$) and uranium-235 ($^{235}U$). In its natural state, uranium occurs as an oxide ore primarily as $U_3O_8$. This oxide ore is concentrated and then fluorinated to yield $UF_6$. The ability to use uranium for controlled fission in nuclear chain reactions in most nuclear reactors depends on increasing the proportion of $^{235}U$ isotope in the material relative to the proportion of $^{238}U$ isotope through an isotopic separation process called enrichment. Depleted uranium (DU) is a residual material which results from the enrichment of uranium ore in the making of nuclear fuel. The U.S. Department of Energy maintains large inventories of depleted uranium at several sites. Approximately 560,000 metric tons of DU in the form of $UF_6$ containing an equivalent mass of 379,000 metric tons of DU are stored at the DOE Paducah, Portsmouth and Oakridge Gaseous Diffusion Plants. Some of the $UF_6$ has been converted to uranium oxide such as $UO_3$ of which about 20,000 metric tons are currently stored at the Savannah River site.

Attempts have been made in the past to render radioactive, hazardous and mixed wastes harmless by incorporating these wastes into inorganic cements or organic polymers. For example, U.S. Pat. No. 5,471,065 to Harell, et al. discloses a process and apparatus for macro-encapsulation of hazardous wastes including depleted uranium. The disclosed process includes encapsulation of DU in containers of high density polyethylene which are sealed by butt fusing.

U.S. Pat. No. 5,015,863 to Takeshima et al., discloses a composite radiation shield made from particles of polyethylene and DU each separately coated with metals of high thermal conductivity.

Methods of encasing DU in concrete by coating a DU core with bismuth as a radiation shielding composition and using DU as an X-ray screening agent in surgical gloves are also known.

Accordingly, there is still a need in the art of long-term management of depleted uranium for a process for encapsulating DU for secondary end-use applications and/or disposal.

It is, therefore, an object of the present invention to provide a process for encapsulating depleted uranium. Another object of this invention is to provide a composition which encapsulates depleted uranium. Yet, another object of the present invention is to provide shapes including depleted uranium for use as radioactive shielding material in the construction of storage vaults and casks for radioactive materials and ballast for aviation or nautical applications.

SUMMARY OF THE INVENTION

The present invention is a process of encapsulating depleted uranium by forming a homogenous, mixture of depleted uranium and molten virgin or recycled thermoplastic polymer into desired shapes. Separate streams of depleted uranium and virgin or recycled thermoplastic polymer are simultaneously subjected to heating and mixing conditions. The depleted uranium can be provided by a batch or continuous evaporation process.

Virgin or recycled thermoplastic polymers useful in the present invention include low density polyethylene, linear low density polyethylene high density polyethylene, polypropylene and mixtures thereof.

The heating and mixing conditions used for encapsulating the depleted uranium can be provided by a thermokinetic mixer, continuous mixer or an extruder. In a preferred embodiment the thermokinetic mixer or continuous mixer precedes extrusion as a pretreatment step.

Depleted uranium aggregates are obtained by pelletization and sintering of depleted uranium powder. In a preferred embodiment depleted uranium aggregates are added to the homogenous mixture of depleted uranium and molten virgin or recycled thermoplastic polymer.

As a result of the present invention, a homogenous mixture of depleted uranium and molten virgin or recycled thermoplastic polymer is obtained which can be molded into any desired shape. The shapes can be molded into counterweights for use in airplanes, helicopters, ships, missiles, armor or projectiles. Panels made from the homogenous mixture of depleted uranium and molten virgin or recycled thermoplastic polymer can be assembled to form radiation shielded containers suitable for storage, transport or disposal of low-level radioactive waste or mixed waste. Shapes obtained from molding the homogenous mixture of depleted uranium and molten virgin or recycled thermoplastic polymer can be molded into shielding material for incorporation in nuclear spent fuel storage, transport or disposal casks. The molding can be accomplished by compression, injection or rotational molding.

The present invention also provides a composition which encapsulates depleted uranium wherein there is a continuum of polyethylene having homogeneously dispersed therein depleted uranium. Depleted uranium that can be encapsulated by the process of the present invention includes $UO_3$, $UO_2$, $U_3O_8$ and $UF_4$. The DUPoly shapes obtained by the process of the present invention can incorporate depleted uranium from about 10 wt % to about 90 wt %, wherein from about 50 wt % to about 90 wt % is preferable and from about 75 wt % to about 90 wt % is most preferred.

As a result of the encapsulation process of the present invention, DUPoly shapes may be obtained which incorporate a high load of depleted uranium up to about 90 wt %. Additionally, these shapes are useful as radiation shielding material for many applications, such as incorporation in nuclear spent fuel storage, transport or disposal tasks or to form a radiation shielded container suitable for storage transport or disposal of low level radioactive wastes or mixed wastes.

For a better understanding of the present invention, reference is made to the drawings, the following detailed description and nonlimiting examples. The scope of the invention is described in the claims which follow the detailed description.

DETAILED DESCRIPTION OF THE INVENTION

Figure 1:
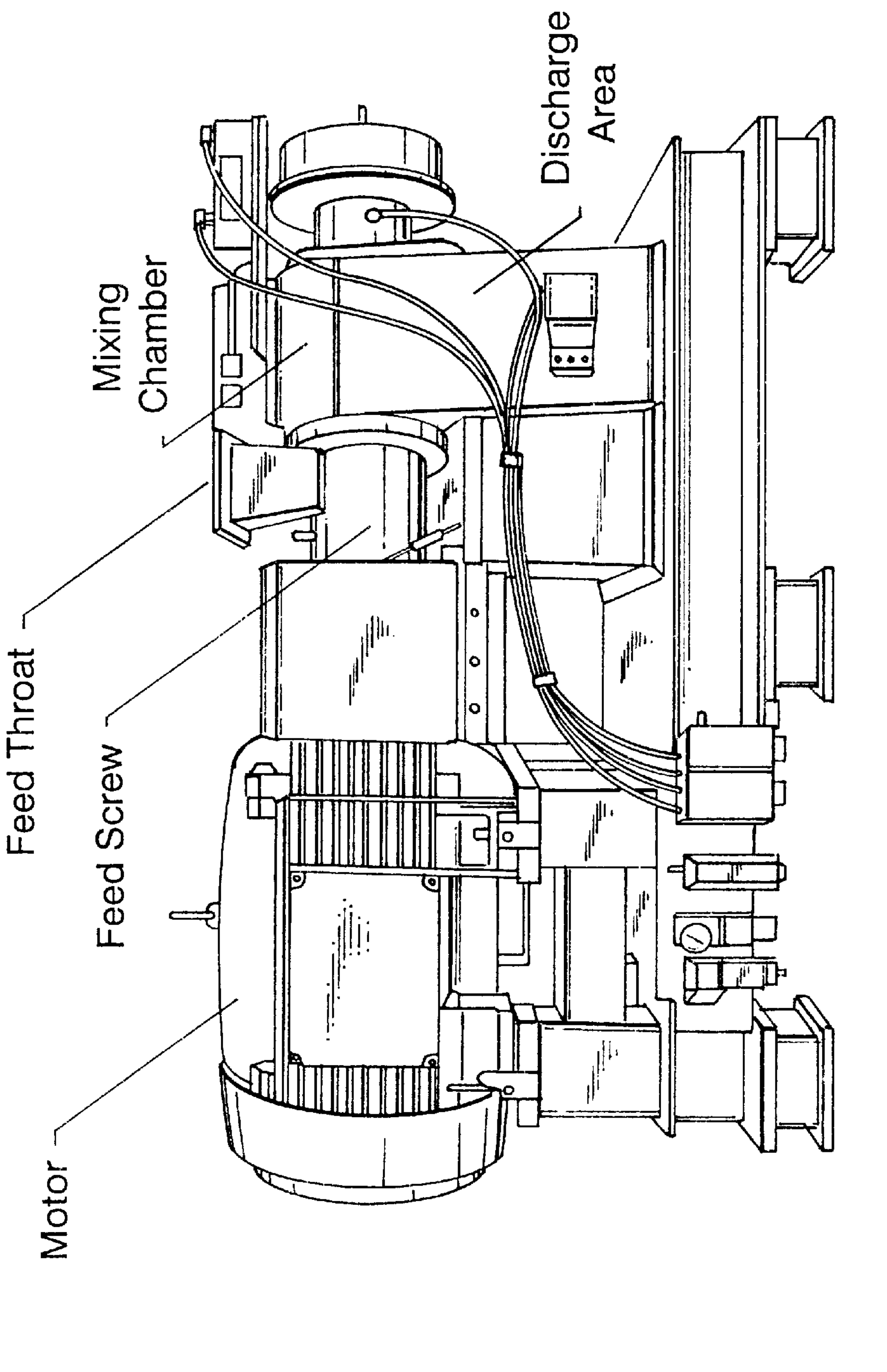
FIG. 1 shows a schematic of a kinetic mixer supplied by Eco LEX Inc.

The present invention provides a process for encapsulation of depleted uranium. Uses of the resulting encapsulated DU as radiation shielding material and in other high density applications are also encompassed by the present invention. The present invention also provides a composition which encapsulates depleted uranium including a continuum of polyethylene having depleted uranium homogeneously dispersed in the polyethylene matrix.

As used in the present invention, depleted uranium (DU) refers to a powder of uranium oxides or uranium fluoride having a $^{235}U$ concentration of about 0.25 weight percent or less. Uranium oxides include $U_3O_8$, $UO_3$ and $UO_2$. Alternatively, uranium tetrafluoride ($UF_4$) may be used.

In a preferred embodiment, DU is homogeneously encapsulated in a matrix of a non-biodegradable thermoplastic polymer such as polyethylene or polypropylene preferably low density polyethylene or LDPE. As used herein, DU microencapsulation refers to a solid matrix wherein DU is homogeneously dispersed throughout the thermoplastic polymer matrix. In contrast, DU macroencapsulation is a process by which the DU containing, matrix (e.g. uranium metal) is itself encapsulated within another barrier material.

In the microencapsulation process of the present inventions DU in form of $UO_3$ powders, was encapsulated in low-density polyethylene using a single-screw extrusion process. Two samples of $UO_3$ were obtained from the Westinghouse Savannah River Site, one produced by a batch process the other by a continuous process. Powders were oven dried to remove all residual moisture prior to processing. Waste and binder materials were fed by calibrated volumetric feeders to the extruder, where the materials were thoroughly mixed and heated to form a homogeneous molten stream of extrudate. Alternatively, materials may be more accurately metered by computer controlled lossinweight feeders. The encapsulated DU, hereafter referred to as DUPoly, was then cooled in cylindrical molds for performance testing and in round disks for attenuation studies.

Waste loadings as high as 90 wt % DU were successfully achieved. A maximum product density of 4.2 g/cm$^3$ was achieved using $UO_3$, but increased product density estimated at 6.1 g/cm$^3$ is projected by using $UO_2$ powder. Additional product density improvements up to about 7.2 g/cm$^3$ are estimated using a hybrid technique known as micro/macroenicapsulation to stabilize both powder and agglomerated forms of $UO_2$.

Waste form performance testing included compressive strength, water immersion and leach testing. Compression test results were in keeping with measurements made with other waste materials encapsulated in polyethylene namely, at approximately 2000 psi. Leach rates were relatively low, from about 0.07% to about 1.1% cumulative fraction released and increased as a function of waste loading. However, considering the insolubility of uranium trioxide, the leach data indicated the probable presence of other, more soluble uranium compounds. Based on ninety (90) day water immersion tests it was concluded that water absorption was inconsequential except for batch process $UO_3$ samples at higher than 85 wt % waste loadings. $UO_3$ samples obtained by a continuous process were not affected by water immersion with no indication of deterioration at even the highest waste loading of 90 wt %.

Any non-biodegradable thermoplastic polymer can be used for the micro and/or macroencapsulation processes of the present invention. Non-biodegradable thermoplastic polymers which are softened or melt at temperatures from 120° C. to about 200° C. are preferred. Virgin or recycled thermoplastic polymers such as polyethylene, polypropylene and the like are useful for the process and composition of the present invention. Recycled thermoplastic polymers including recycled blends in any combination of the following polymers: low density polyethylene (LDPE), linear low density polyethylene (LLDPE), polypropylene (PP), and high density polyethylene (HDPF) can also be used for the processes and composition of the present invention.

Polyethylene is an inert thermoplastic polymer with a melt temperature of 120° C. When heated above its melting point, polyethylene can combine with DU to form a homogeneous mixture, which upon cooling, yields a monolithic solid DUPoly form. Molten DUPoly may be molded into a desirable shape. In contrast to conventional binding agents, such as hydraulic cement the use of polyethylene as a binder has several distinct advantages. Solidification is assured on cooling because no chemical reactions are required for curing. Polyethylene encapsulation results in higher loading efficiencies and better DUPoly form performance when compared with hydraulic cements. Processing is simplified as variations in DU composition do not require adjustment of the solidification chemistry. As a result, DU polyethylene encapsulation processes provide overall cost savings. Thus, polyethylene is the preferred binder for the composition and process of the present invention, of which low-density polyethylene is most preferred.

Low-density polyethylene (LDPE) is produced by a process which utilizes high reaction pressures (15,000 to 45,000 psi) resulting in the formation of large numbers of polymer branches. These branches occur at a frequency of 10–20 per 1000 carbon atoms, creating a relatively open structure. Typically, low-density polyethylenes have densities ranging between 0.910 and 0.925 g/cm$^3$. High density polyethylene (HDPE) is manufactured by a low pressure (<1500 psi) process in the presence of special catalysts which allow the formation of long linear chains of polymerized ethylene. There are very few side chain branches in an HDPL molecule resulting in a close packed or dense structure. HDPE, densities range between 0.941 and 0.959 g/cm$^3$. Medium density polyethylenes (0.926–0.940 g/cm$^3$) can be formulated by either high or low pressure methods, or by combining LDPE and HDPE materials.

Another polyethylene useful in the process of the present invention is linear low-density polyethylene (LLDPE). By contrast to LDPE, in LLDPE, there is no long-chain branching. Density is controlled by the addition of comonomers such as butene, hexene, or octene to the ethylene. These comonomers give rise to short-chain branches of different lengths: two carbon atoms for butene, four for hexene and six for octene. The length of the short-chain branches determines some of the strength characteristics of LLDPE. The absence of long-chain branches in LLDPE plays a significant role in the difference in extrusion characteristics between LLDPE and LDPE. LLDPE densities range between 0.92 and 0.98 g/cm$^3$.

The properties of low, medium, and high-density polyethylenes have been summarized by Schuman, R. C., in "Polyethylene," *Modern Plastics Encyclopedia,* 52, No. 10A, J. Agranoff, ed., McGraw Hill Publications Co., New York, October 1975, and by Maraschin, N. J., in "Polyethylene, High Density," *The Wiley Encyclopedia of Packaging Technology*, p. 514–529, M. Bakker, ed., New York, 1986, the contents of which are incorporated by reference as if set forth in full.

The properties of high-density polyethylene, e.g., mechanical strength and resistance to harsh chemical environments might provide a slight advantage in the encapsulation of low-level radioactive waste. Processing of high-density polyethylene is more difficult, however, as it requires greater temperatures and pressures. The properties of LDPE are nonetheless favorable, and thus LDPE is preferred as encapsulating or binding agent for the present invention. Injection molding grade LDPE having a high melt index from about 50 g/10 minutes to about 55 g/10 minutes is most preferred because it has the optimal melt viscosity for mixing with DU constituents found in the process of the present invention.

Polyethylene has been used as a binder for encapsulation of a wide range of waste types. DUPoly forms provide a strong, durable and homogeneous encapsulating matrix which is resistant to ionizing radiation, microbial degradation, chemical attack by organic and inorganic solvents, environmental stress cracking and photodegradation. Flammability of LDPE has been rated by the National Fire Protection Association as "slight" based on its relatively high flash and self-ignition points.

The loadings of DU can be from about 10 wt % to about 90 wt %, preferably from about 50 wt % to about 90 wt % and most preferably from about 75 wt % to about 90 wt % of the composition of the present invention and still maintain 2000 psi compressive strength. The low-density polyethylene binder can be present in a concentration from about 90 wt % to about 10 wt %, preferably from about 50 wt % to about 10 wt % and most preferably from about 25 wt % to about 10 wt % of the composition.

Alternative processing techniques can be used to improve the final polyethylene encapsulated DU product. Options for treated DU include re-use as radiation shielding, counterweights in aviation and nautical applications, etc. or as a matrix for disposal of other low-level radioactive waste. In either case it is desirable to maximize the amount of depleted uranium that can be loaded into the final product while maintaining the physical and performance characteristics required of the product. Greater depleted uranium loading is indicated by higher DUPoly product densities which also translates into enhanced shielding properties, smaller counterweights and lower disposal costs due to volume reduction.

DU loading for the polyethylene encapsulation technology can be optimized in many ways. For example, uranium packing efficiency can be further enhanced by using several processing options, applied individually or combined. These include:

(i) compression molding techniques;

(ii) kinetic mixing to enhance extrusion processing;

(iii) use of uranium oxide powders (e.g., $UO_2$, $U_3O_8$) with higher densities than $UO_3$;

(iv) pelletization of uranium oxide powders for use as an aggregate additive to supplement the microencapsulated DU;

(v) sintering of uranium oxide pellets prior to use as an aggregate additive.

As a result of using the above techniques the DU loading of and DUPoly density can be enhanced.

One approach involved applying pressure to compress the DUPoly extrudate prior to solidification. Results at compression pressures up to 1.72 MPa (250 psi) showed higher densities for the compressed DUPoly product compared to the non-compressed, for the same weight percent DU loading. This translates into a greater quantity of depleted uranium within the same volume of product, as discussed earlier.

Thermokinetic mixing is another alternative or supplement to extrusion processing for microencapsulation in polyethylene. This process relies on high shear and rapid rotational mixing and kinetic energy to volatilize residual moisture and homogenize and melt the mixture.

In the present invention, the kinetic mixer can be used to provide the heating and mixing conditions required to form a homogeneous, mixture of depleted uranium molten and polyethylene. More preferably, however, the thermokinetic mixing is used as pretreatment process. When operated as a pretreatment process, the waste-binder mixture can either be discharged as a molten, well-mixed product or as a mixture of dried waste with unmelted polymer, depending on the residence time in the mixer and on further process by conventional extrusion.

When used in a pretreatment step, the kinetic mixer enhances the removal of residual moisture, improves the mixing between depleted uranium and the encapsulating polymer and may result in improved DU loadings. A useful kinetic mixer is manufactured by LFX Inc. of Brampton, Ontario, Canada as shown in FIG. 1. Operation of the kinetic mixer is controlled by a programmable logic controller, which enables the operator to coordinate feeding and charging, mixing and discharging of the materials.

DUPoly processing may also be accomplished by using continuous mixers which operate with two adjoining, non-intermeshing, counter-rotating rotors. Intense mixing provided by the interchange of material between the two rotors and a combination of frictional energy and external heaters serve to melt and mix the thermoplastic polymer and depleted uranium. Various designs of continuous mixers may incorporate longer or unique rotors to enhance mixing. A second extrusion stage may also be made part of the continuous mixer. A continuous mixer can also be followed by an extruder as a separate piece of equipment. A useful continuous mixer is manufactured by Pomini Inc. of Brecksville, Ohio.

Figure 2:
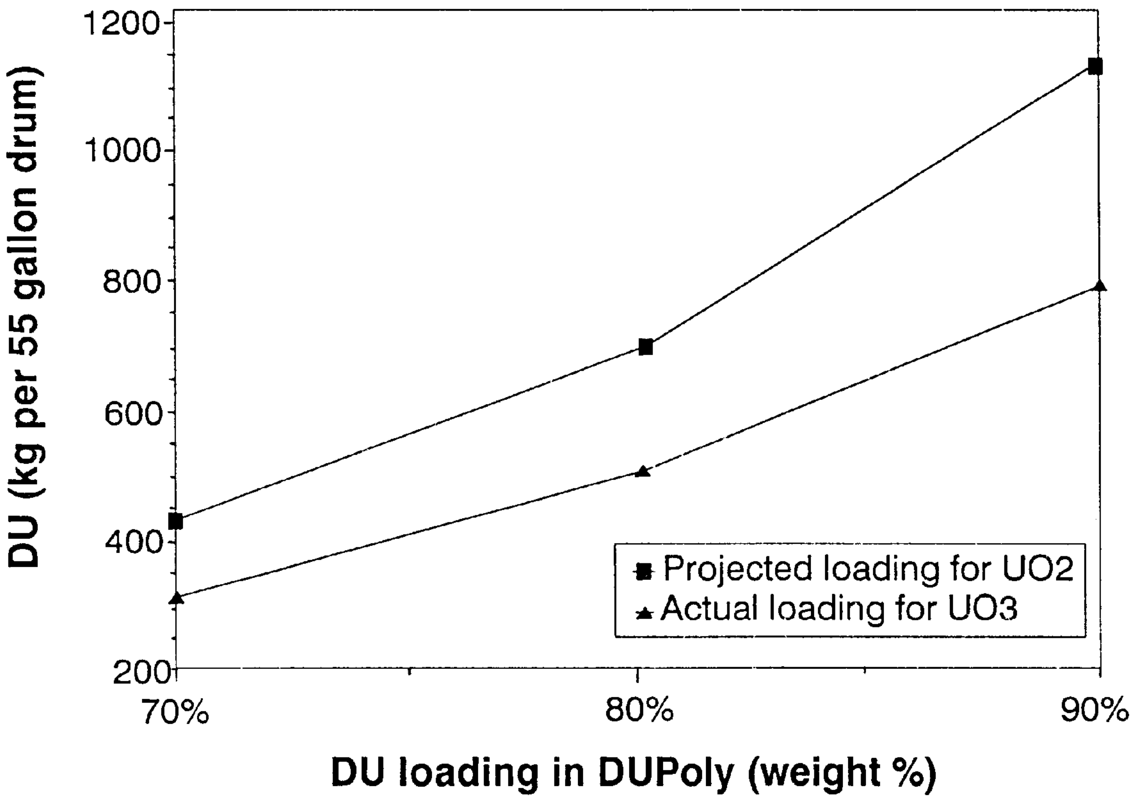
FIG. 2 illustrates a projected comparison of loading efficiency for $UO_2$ based on microencapsulation of $UO_3$.

In the process of the present invention depleted uranium in the form of $UO_3$ powders currently stored at Savannah River Site (SRS) was used. Alternatively, conversion of $UF_6$ can be controlled to form oxides of higher density or stable $UF_4$ powders. For example, the theoretical densities of $UO_2$ and $U_3O_8$ are 10.9 g/cm$^3$ and 8.3 g/cm$^3$, respectively, compared with a theoretical density of 7.3 g/cm$^3$ for $UO_3$ or 6.7 g,/cm$^3$ for $UF_4$. Projected improvement in product densities and volumetric loading of DU using $UO_2$ are shown in FIG. 2.

In the present invention DU was processed by microencapsulation, a process in which individual DU particles are encapsulated within a polyethylene binder to form a homogeneous product. Macroencapsulation, as previously defined, includes the encapsulation of larger particles within a plastic coating. Another technique to improve DU loading and the densities of resultant product is to supplement the microencapsulation treatment with pelletized DU aggregate. In other words, solid DU aggregate in the form of pellets or briquettes is macroencapsulated with DUPoly in a hybrid micro/macroencapsulation process. By choosing to use the DUPoly extrudate, i.e., microencapsulated DU, as the binder material for macroencapsulation, a greater overall DU packing efficiency can be achieved for the final product as compared to that of compressed DUPoly alone.

Figure 3:
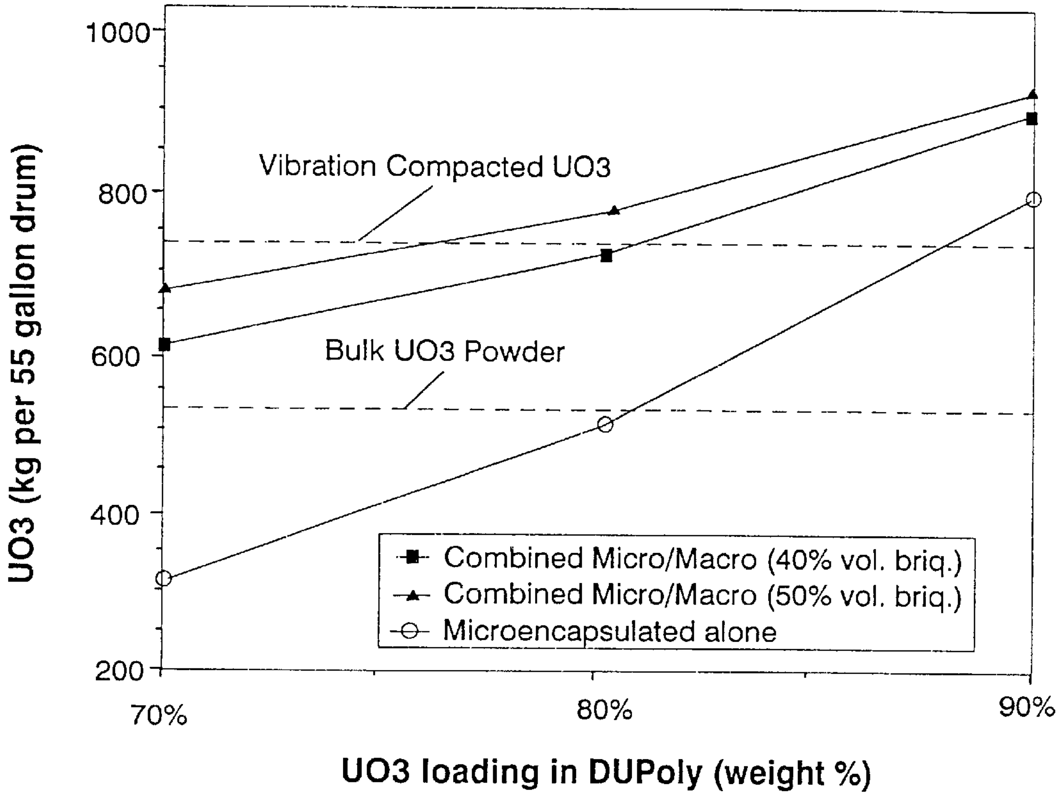
FIG. 3 shows a comparison of DUPoly microencapsulation with the projected loading for a hybrid DUPoly micro/macroencapsulation technique as a function of $UO_3$ loading.

The total volume of depleted uranium can be effectively incorporated into a micro/macro product. Several factors affecting product density include density of compacted DU pellets or briquettes, percent volume of DU pellets or briquettes that can be successfully encapsulated, and loading of the DU within the DUPoly binder. FIG. 3 shows that improved DU loadings can be achieved for a micro/macro DU product of density of 4.6 g/cm$^3$ assuming 90 wt% DU in the DUPoly and 50 volume % DU briquettes having a briquette density of 5 g/cm$^3$, which is twice the bulk density of DU used in the present invention.

Figure 4:
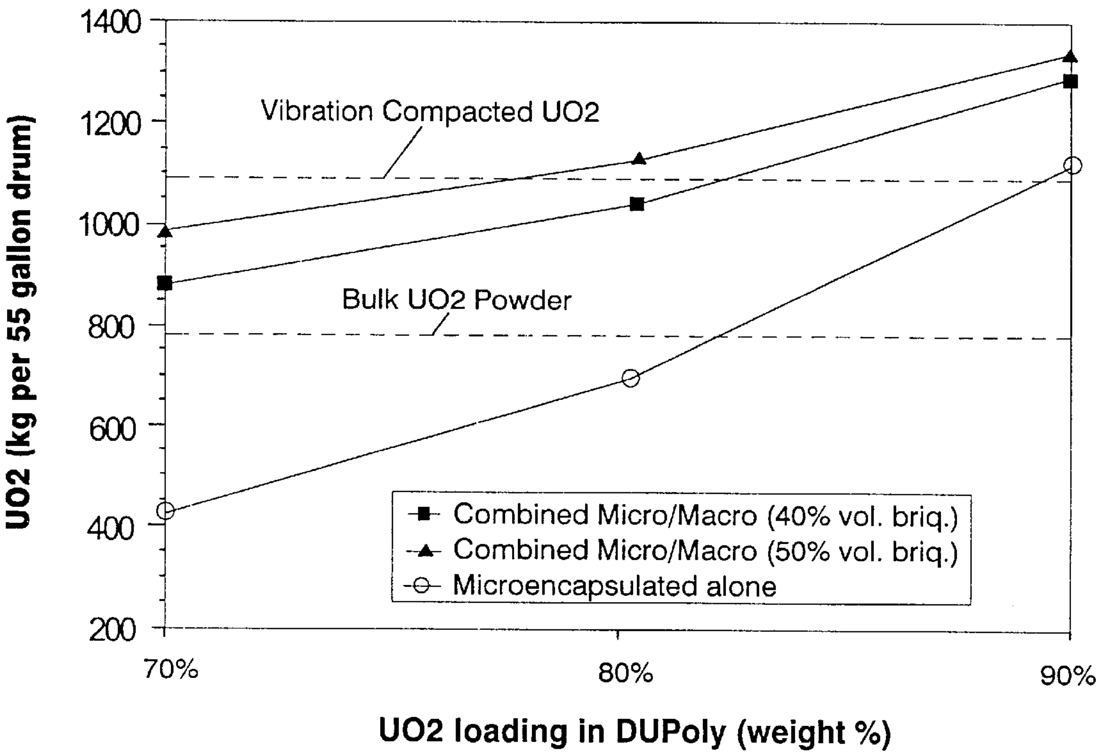
FIG. 4 shows a comparison of DUPoly microencapsulation with the projected loading for a hybrid DUPoly micro/macroencapsulation technique as a function of $UO_2$ loading.

Similarly, as shown in FIG. 4, even greater DU loadings can be attained if $UO_2$ is used to formulate the micro/macro product yielding an estimated product density of 6.8 g/cm$^3$.

Figure 5:
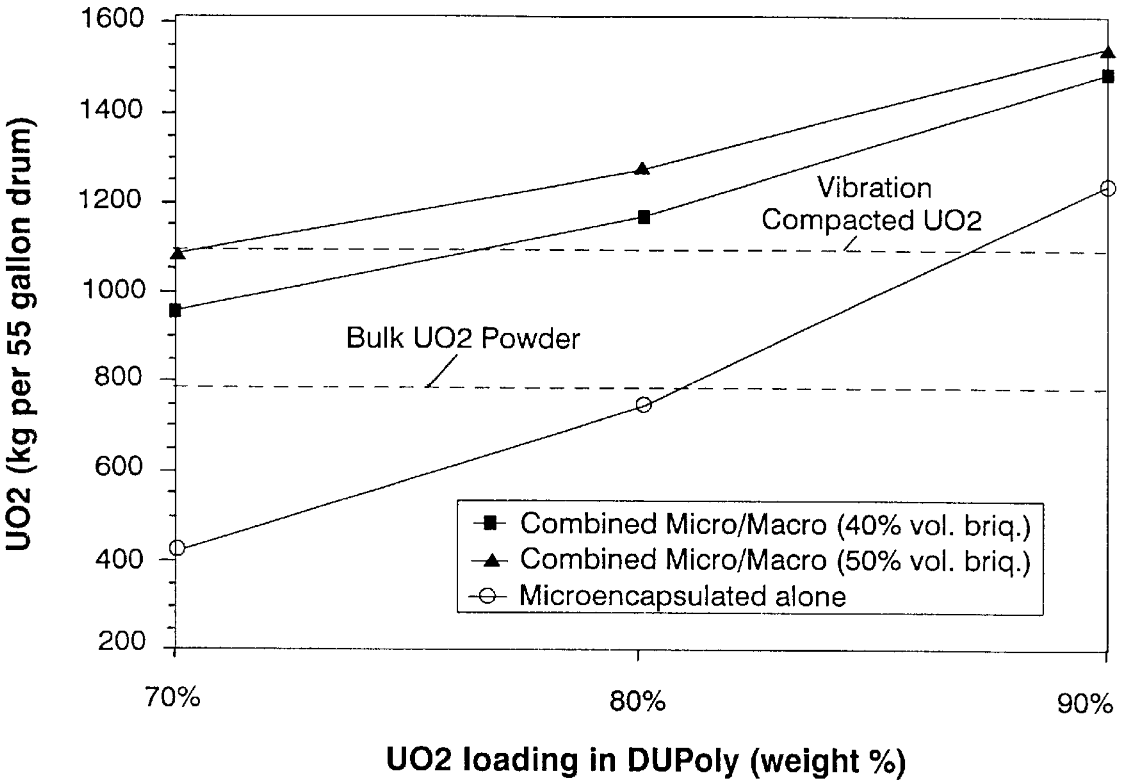
FIG. 5 shows a projected comparison of DUPoly microencapsulation ($UO_2$) with a hybrid micro/macroencapsulation technique using sintered $UO_2$.

A variation of the micro/macroencapsulation approach discussed above involves sintering uranium oxide powders at high temperature and pressure to achieve aggregate densities within 90% of the theoretical crystal densities. Applying this technique in conjunction with micro/macroencapsulation of $UO_2$ can yield even higher DUPoly waste loadings and densities. This is shown in FIG. 5, which assumes a sintered aggregate density of 8.40 g/cm$^3$ based on ground $UO_3$ powder sintered at 1,250° C. in a dry $H_2$ atmosphere, resulting in a predicted DU product density of 7.24 g/cm$^3$.

Figure 6:
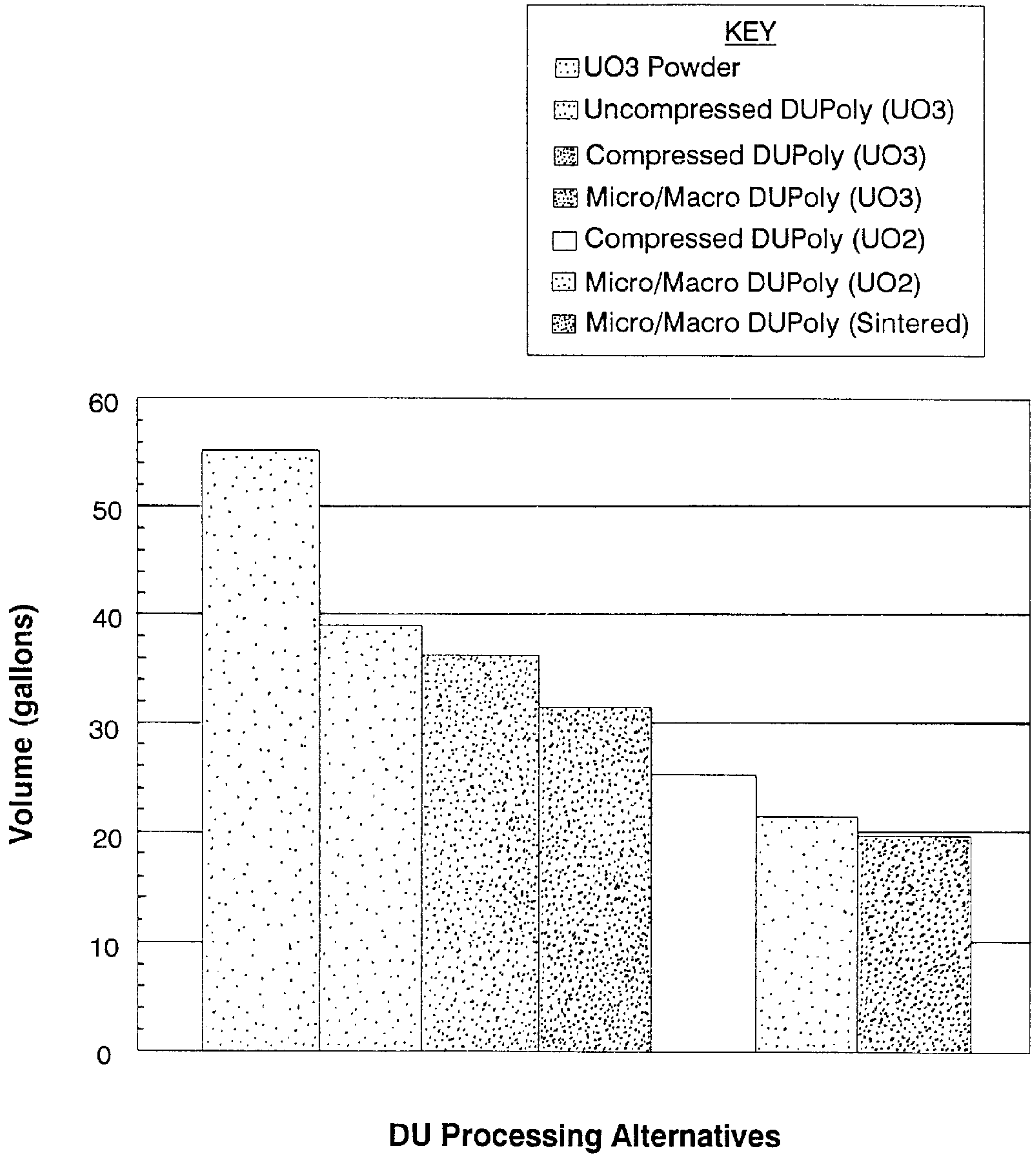
FIG. 6 shows projected volumes of equivalent quantities of $UO_3$ for various processing alternatives.

Each of the options discussed herein are compared on an equivalent basis using the bulk density of $UO_3$ in FIG. 6. Assuming a disposal scenario, this plot shows potential for reductions in volume using the various alternatives, compared with the baseline of simply storing DU in a 55 gallon drum. The micro/macro DU processing alternative has the potential for incorporating the greatest volume of DU compared to all other alternatives, especially if sintered DU aggregate is used. Moreover, the micro/macro encapsulation processes of the present invention provides stable DUPoly forms which are strong, durable and do not leach even though no antileaching anhydrous additives such as calcium hydroxide, sodium hydroxide, sodium sulfide, calcium oxide, magnesium oxide or mixtures thereof were present in the DU waste.

DUPoly products can be used successfully in radiation shielding, counterweights/ballast for use in airplanes, helicopters, ships and missiles, flywheels, armor, and projectiles. Since DUPoly is an effective shielding material for both gamma and neutron radiation it has application for shielding high activity waste (namely ion exchange resins and glass gems) spent fuel dry storage casks, and high energy experimental facilities (namely accelerator targets) to reduce radiation exposures to workers and the public.

EXAMPLES

The following examples serve to provide further appreciation of the invention but are not meant in any way to restrict the effective scope of the invention.

Example 1

This example shows the use of LDPE to encapsulate DU from Westinghouse Savannah River Company.

1. Preparation of DUPoly Sample

Representative samples of DU materials from Westinghouse Savannah River Company were used for treatability testing. The inventory at Savannah River Site (SRS) alone consisted of about 20 million kg (20,000 metric tons) of depleted uranium trioxide ($UO_3$) stored in some 35,000 (55 gallon) drums. This inventory consisted of material corresponding to two different evaporation processes (batch and continuous) used to prepare the oxide. Approximately 99% of the SRS inventory was comprised of batch process material.

Two drums of batch processed $UO_3$ were obtained for the experimental work of this example. Approximately 110 kg (240 lb) of this material was consumed during process and product testing. The bright yellow powders were free-flowing with little to no lumps. A sample of the continuous process $UO_3$ was also used in this example. The continuous process powder was also yellow but with a slight gray tint, and was somewhat inhomogeneous, containing clumps or hardened regions of noticeably brighter yellow colored material. This material was received in two 20 liter (5 gal.) shipping pails, having a net weight of approximately 45 kg (100 lb) each. Approximately half of this material was used during testing.

The $UO_3$ inventory at SRS was characterized by Carolina Metals, Inc. The drummed material was generically described as a 200 mesh (74 $\mu$m average particle size), 96.5% uranium trioxide with trace impurities of aluminum, iron, phosphorous, sodium, silicon, chromium and nickel. The material had a bulk density range of about 2.5 g/cm$^3$ (158 lb/ft$^3$ ), uncompacted, to 3.5 g/cm$^3$ (223 lb/ft$^3$), compacted. The $^{235}U$ content was assayed at approximately 0.2% and the plutonium content at 3 ppb. Gross gamma radiation was measured at 53,100 dpm per gram of uranium. The two sample lots differ only in their particle size distribution, the continuous process material having a slightly larger mean particle size. No quantification of the particle size distribution was performed at BNL as specific particle size data was already published by Carolina Metals.

Moisture content of the as-received powders was determined prior to extrusion processing because past experience has indicated excessive water volatilization occurs during extrusion on processing if the moisture content of the bulk powder exceeds 2 wt %. Both batch and continuous process samples were oven dried at 160° C. for 24 hours to determine their respective dry weights. Moisture content of the material was measured by oven drying. As-received batch process material was measured to have 0.4 wt % moisture content while continuous process material had 1.6 wt % moisture content.

Figure 7:
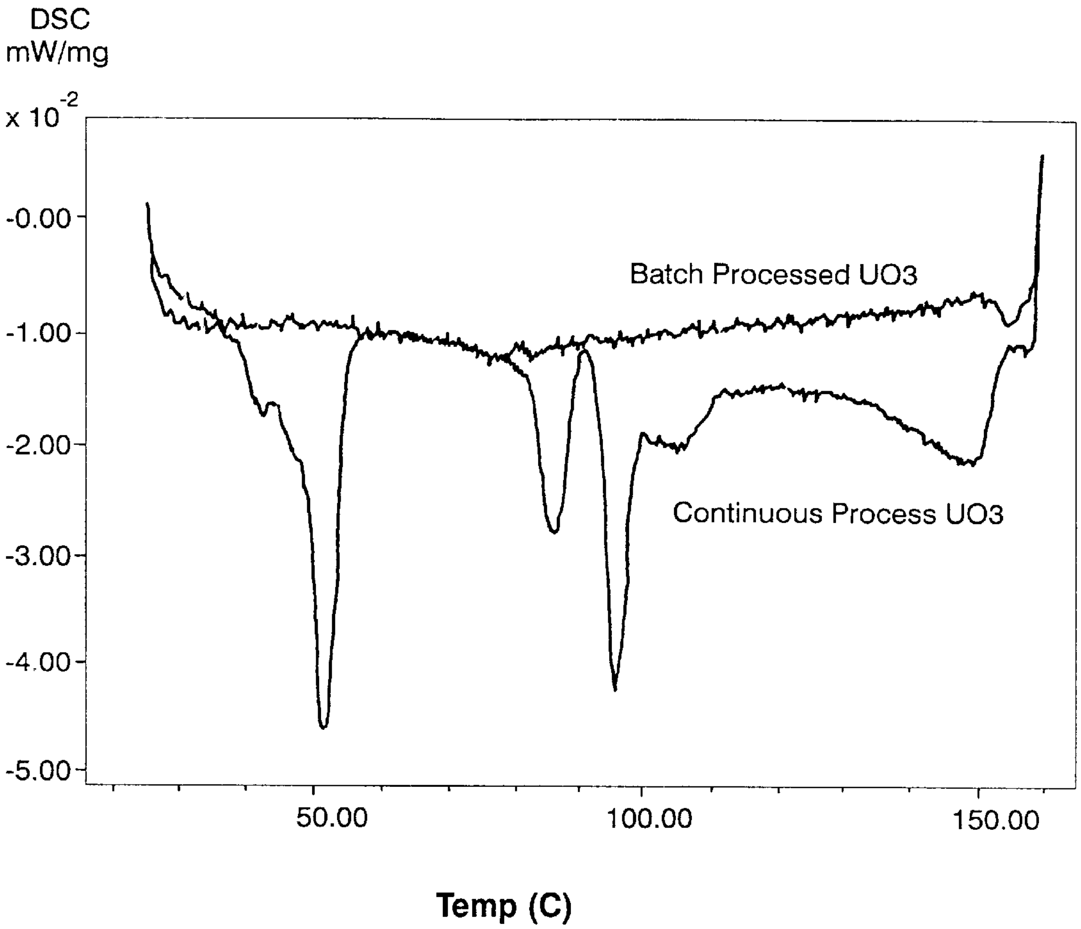
FIG. 7 shows differential scanning calorimeter output (mW/mg vs. ° C.) for as-received batch and continuous process DU.

Low temperature differential scanning calorimetry was also performed on samples of the two lots, heating at 2° C./min from 20° C. to 160° C. As-received batch process material showed no peaks in the 20° C. to 160° C. temperature range while as-received continuous process material showed characteristic endotherms at about 40° C., 50° C., 85° C., 95° C., 105° C., and 145° C. as shown in FIG. 7, which evidenced low temperature reactions or phase changes occurring in the material. In contrast, samples of the dried materials, namely, batch and continuous process material heated at 160° C. for 24 hours showed no peaks in the 20° to 160° C. temperature range. Thus, the drying pretreatment indicated the production of a thermally stable product within the desired processing temperature range.

2. Equipment

Processing of depleted uranium was conducted by extrusion to assess the potential loading that can be incorporated in polyethylene. Extrusion is a robust thermoplastic processing technique that has been used extensively throughout the plastics industry in many applications. For this application, extrusion processing results provide an indication of the potential DU loading that can be achieved. Other processing techniques such as thermokinetic mixing may provide additional DU loading improvements.

Figure 8:
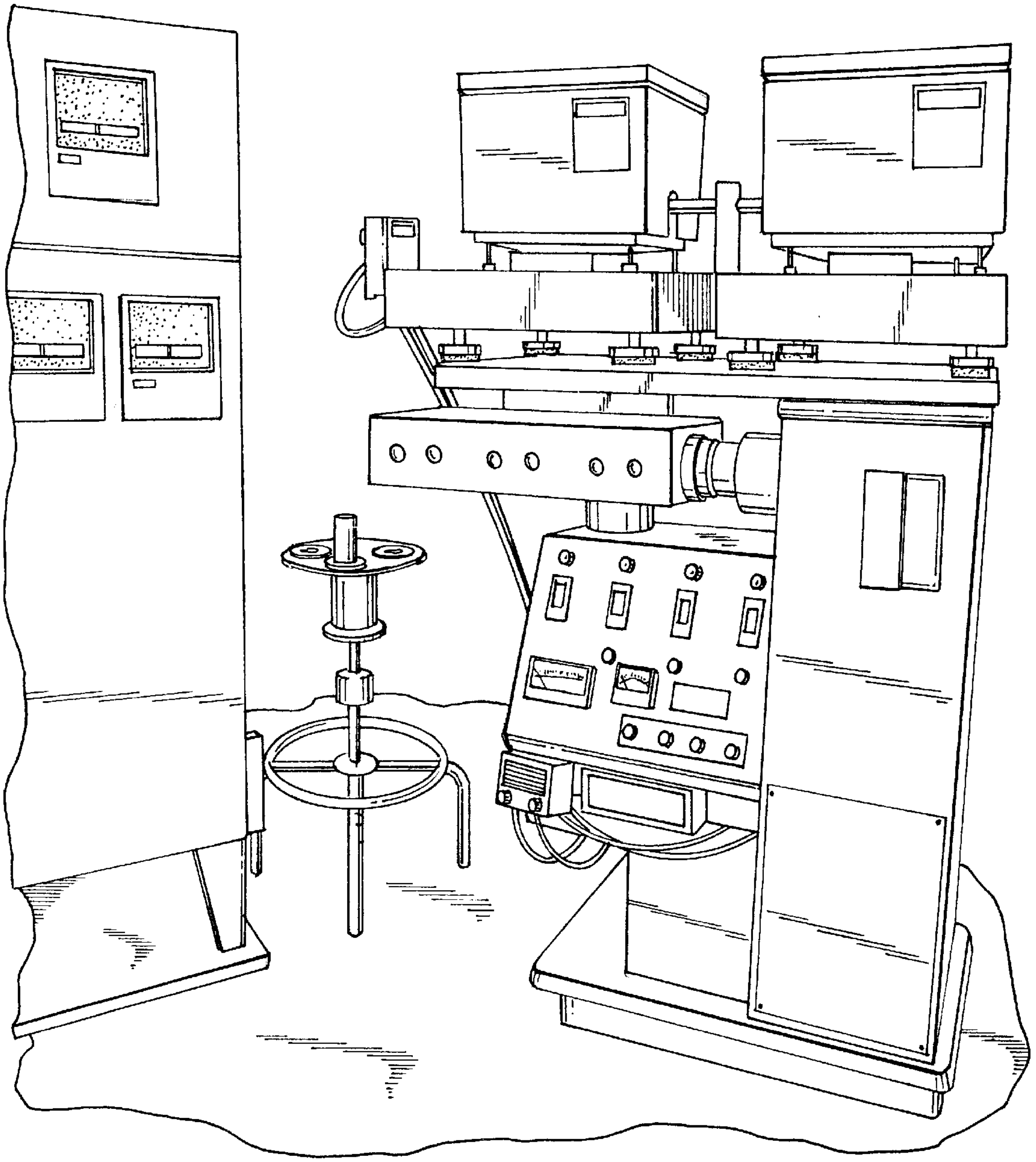
FIG. 8 shows a bench-scale Killion plastics extruder.

A 32 mm (1.25 in.) diameter single-screw, non-vented, Killion extruder, as shown in FIG. 8, was used for processibility testing. The extruder was equipped with a basic metering screw, three heating/cooling barrel zones and an individually heated die. DU and polyethylene were homogeneously mixed during processing in the extruder following simultaneous controlled feed metering using AccuRate, 300 Series, volumetric feeders. These feeders were designed to provide a constant volume output at a given operating setting that varied as a percentage from zero to 100% output. Feeder calibration was required for each material due to differing material densities and was conducted by recording the feeder output in grams over a one minute interval at five different feeder speed settings. Fen replicates were taken at each speed setting. The resulting data provided a plot of feeder output in grams per minute (g/min) versus feeder speed setting. During this study, feeder calibrations were performed for the polyethylene and for each type of DU, i.e., batch process DU and continuous process DU. Alternatively, loss-in-weight gravimetric feeders can be used to avoid the need for calibration and improve metering accuracy to approximately ±1%.

3. Processibility Testing Procedure

Processibility testing included identifying key extrusion parameters such as temperature profiles (zone temperatures) and feed and process rates, as well as monitoring product appearance, consistency and throughput. Current draw, melt temperature, melt pressure and extrudate product appearance were recorded at a constant extruder screw speed to gauge whether the material was amenable to extrusion processing.

As used in the present invention "extrudate" refers to the stream of molten product that exits the extruder through the output die. Monitoring these processing parameters along with visual observations of feeding, noise and output provided valuable information regarding the processibility of the DU.

A number of different samples were fabricated to measure quantitatively the processing results. Ten replicates were typically measured in order to obtain statistically significant results. These samples are abbreviated as: rate, grab. 2×4, and ALT. Replicates of each sample were taken sequentially and periodically throughout the processibility trials at given DU loadings.

Rate and grab samples were used to monitor material processibility whereas 2×4 and ALT samples were used primarily to measure product performance. In addition to these processing and product samples, disk samples were also fabricated for future shielding and attenuation studies.

A. Rate Samples

Rate samples were one minute samples collected to determine extruder output (g/min) and consistency over an extrusion trial. Low variation between replicate rate samples indicated a continuous output and successful processibility at that DU loading.

B. Grab Samples

Grab samples were taken periodically over an extrusion trial as small representative specimens of the extrudate. Each sample varied between 3 g to 10 g. The density of each grab sample was determined by weighing and using a Quantachrome Multipycnometer to measure their volume. Monitoring the product density was useful for quality control and to ensure homogeneity of the product. Low variation between replicate grab samples indicated that the DU material was feeding well and was consistently becoming homogeneously mixed with the polyethylene as it was processed in the extruder.

C. 2×4 Samples

2×4 samples were fabricated as right cylindrical specimens for compressive strength and water immersion testing. The sample name refers to the nominal dimensions, 2 in. diameter by 4 in. height (5 cm×10 cm) used in the ASTM D695, "Compressive Properties of Rigid Plastics." The specimens were cast in pre-heated brass molds. Teflon plugs were inserted into the top of the mold after filling, then a slight compressive force was applied, up to a maximum 0.17 MPa (25 psi). This technique produced smooth, uniform specimens.

D. ALT Samples

ALT samples for product leach testing were fabricated in individual Teflon molds periodically throughout an extrusion trial. Samples had nominal dimensions of 1 in. diameter by 1 in. high right cylinders (2.5 cm×2.5 cm), as specified by the Accelerated Leach Test (ALT), ASTM C1308. These samples were molded under moderate compression of up to 1.72 MPa (250 psi). These samples were also used to determine DUPoly densities achievable when using a compression molding technique.

E. Disk Samples

Disk samples were formed in circular glass petri dishes and molded under slight compression (max. 0.17 MPa (25 psi)). Disk samples were fabricated at varying thicknesses for future attenuation studies to determine the effectiveness of the product as a shielding material.

Example 2

In this example, processibility testing was conducted with samples representing two different evaporation processes, batch and continuous process used in generating the uranium trioxide inventory at Savannah River Site. The batch process depleted uranium represents over 99% of the SRS inventory. Processibility testing concluded with extrusion trials of the newer continuous process DU.

1. Processibility of Batch Process DU

Processibility testing with batch processed DU (batch DU) was initiated at a loading of 50 weight percent (wt %). This loading was selected based on previous experience with other materials and was expected to be readily achievable. Starting at this DU loading also enabled key process variables to be tuned for future attempts at higher DU loadings. If a maximum waste loading is attained or if a material is not readily processible, a number of conditions are observed such as an increase in die pressure, increased load or current draw on the drive motor, inconsistent output flow coupled with surging that can be observed on the ammeter and pressure transducer. Processing at 50 wt % with oven-dried DU produced excellent results. Some high pitched screw squealing occurred while processing the DU, but processing and product samples were not affected. Utilizing dried DU, successful processing results were obtained at increasing waste loadings of 60, 70, 75, 80, 85 and 90 weight percent. It was noted that the extrudate or product appearance gradually changed with increases in DU loading. As the loading was increased, the glossy appearance of the extrudate waned. Since the glossy appearance of the extrudate was caused by polyethylene, these results were expected as the actual quantity of polyethylene was reduced with increased DU loading. At 85 wt % and especially 90 wt % the extrudate had a rough texture with a discontinuous surface whereas at 80 wt % and below the surface appearance of the extrudate was relatively smooth. However, even at 85 and 90 wt % the DU was readily processible and could be successfully cast into process and product specimens.

Attempts to extrude 95 wt % DU were not successful due to plugging in the output die, causing, output to cease and die pressure readings to rise above their alarm set point (3570 psi). The extruder was equipped with a pressure safety relief valve rated at 7500 psi. At this loading there was insufficient polyethylene to mix, wet and convey the DU through the extruder barrel. DU flow was stopped immediately after noting the plugged condition. The clog was voided within several minutes by introducing pure polyethylene to the screw. Current draw by the screw rose slightly during this episode, but remained within acceptable limits. Therefore, a loading of 90 wt % represented the upper limit for microencapsulating batch DU into a polyethylene matrix utilizing a continuous extrusion process.

2. Processibility of Continuous Process DU

The $UO_3$ produced by a new continuous evaporation process at SRS was reportedly chemically identical to the batch $UO_3$ but characterized by a slightly larger particle size. Since larger particles can be more easily compounded or mixed during extrusion processing, it was expected that the continuous process DU (continuous DU) would have equivalent or improved processibility compared with the batch DU. For the continuous DU sample, loadings of 70, 80 and 90 wt % were selected to test its processibility. Results were successful and replicate processing and product samples were fabricated at each waste loading using dried DU. From a visual perspective, the product output was darker in color than the batch DU but other product observations were similar. The glossy appearance of the product waned with increasing DU loading and at 90 wt % the extrudate retained the rough texture with a discontinuous surface as initially observed with the batch DU.

Throughout processing with either sample of batch or continuous DU, squealing of the screw occurred without a deleterious impact on processibility. The squeaks were not heard while purging the extruder with polyethylene prior to and between each run. It is believed that the squeaks were caused by the shearing of the $UO_3$ between the screw flights and the barrel wall.

The overall success encountered during processing both the batch and continuous DU samples can be seen in evaluating the rate and grab sample data. The results from the process rate samples taken during each processibility trial are shown in Table 1 below.

TABLE 1

Process Rate Samples for Batch and Continuous Process DUPoly.

| Waste Loading | Rate (g/min) | Std. Dev. | 2σ Error | % Error |
|---|---|---|---|---|
| Batch DU (10 replicates per waste loading) | | | | |
| 50 | 114.23 | 3.45 | 2.47 | 2.16 |
| 60 | 109.93 | 2.71 | 1.94 | 1.76 |
| 70 | 111.69 | 3.37 | 2.41 | 2.16 |
| 75 | 117.78 | 1.48 | 1.06 | 0.90 |
| 80 | 125.63 | 2.27 | 1.62 | 1.29 |
| 85 | 124.13 | 2.87 | 2.05 | 1.65 |
| 90 | 120.30 | 2.36 | 1.69 | 1.40 |
| Continuous DU (10 replicates per waste loading) | | | | |
| 70 | 110.41 | 2.10 | 1.50 | 1.36 |
| 80 | 113.45 | 1.97 | 1.41 | 1.25 |
| 90 | 117.87 | 3.85 | 2.75 | 2.34 |

As shown in Table 1 above, the actual extruder output rate in grams per minute was not significant in gauging processibility of the DU since different screw speeds and feed rates were used but rather the low deviation and small errors between replicate samples at each loading should be noted. The low variation between replicate samples taken at each DU loading indicated that the DU processed continuously and consistently, and was therefore amenable to extrusion processing even at a loading of 90 wt %. The extrusion trials were conducted at screw speeds of either 60 or 65 rpm and at combined feed rates between 100 and 120 g/min. Combined feed rates refers to the total quantity of material, both DU and polyethylene, being fed to the extruder.

The grab samples which were taken during each processibility trial were used to determine the density of the extrudate and to monitor extrudate homogeneity throughout an extrusion run. The data for the grab samples for all extrusion trials is shown in Table 2 below.

TABLE 2

Grab Sample Densities for Batch and Continuous Process DUPoly.

| Waste Loading | Density ($g/cm^3$) | Std. Dev. | 2σ Error | % Error |
|---|---|---|---|---|
| Batch DU (10 replicates per waste loading) | | | | |
| 50 | 1.50 | 0.04 | 0.03 | 1.89 |
| 60 | 1.73 | 0.02 | 0.01 | 0.80 |
| 70 | 2.13 | 0.04 | 0.03 | 1.42 |
| 75 | 2.50 | 0.03 | 0.02 | 0.88 |
| 80 | 2.70 | 0.09 | 0.07 | 2.46 |
| 85 | 2.98 | 0.04 | 0.03 | 1.05 |
| 90 | 4.21 | 0.05 | 0.04 | 0.84 |
| Continuous DU (10 replicates per waste loading) | | | | |
| 70 | 2.34 | 0.03 | 0.02 | 1.03 |
| 80 | 2.86 | 0.03 | 0.02 | 0.84 |
| 90 | 4.03 | 0.07 | 0.05 | 1.16 |

For each DU sample at each waste loading, low deviation and errors were obtained between replicate samples indicating that the DU product was homogeneous and that the DU consistently became well mixed with the polyethylene as it was processed in the extruder. Despite the rough texture and discontinuous surface of the extrudate observed at 90 wt % grab sample values indicate that the extrudate was still homogeneous. The actual density values increased with increasing DU loading, as expected.

Example 3

In this example DUPoly properties of strength, durability and leachability were tested. These properties were tested by conducting density measurement, compressive strength testing, accelerated leach testing and 90 day water immersion testing.

1. Density Measurement

Densities of all DUPoly samples prepared were measured. For all but the "grab" samples of Example 1, density was calculated as sample mass divided by geometric volume. Test samples measured included nominal 2×4 right cylinders (both uncompressed samples formed in polyethylene containers and compressed samples formed in heated brass molds) 1×1 inch right cylinders (formed either uncompressed using 2.5 cm (1 in) diameter copper tubing as a mold, or under pressure using Teflon molds) and nominal 11.7 cm (4.6 in) diameter disk samples (prepared as in Example 1, described above). The data shown in Table 3 represent the mean and 2σ values for each sample type and DU loading. At least 10 each of the 2×4 and 1×1 samples were measured for a given DU loading. Typically 6–8 disk samples, representing three different sample thicknesses, were measured for each DU loading.

TABLE 3

DUPoly Sample Densities (g/$cm^3$).

| DU type/wt % | disk compressed[1] | 2 × 4 cylinders uncompressed | 1 × 1 ALT uncompressed | 2 × 4 cylinders compressed[1] | 1 × 1 ALT compressed[2] |
|---|---|---|---|---|---|
| batch/50 wt % | 1.38 ± 0.06 | 1.38 ± 0.02 | 1.43 ± 0.02 | 1.62 ± 0.02 | NA[3] |
| batch/60 wt % | 1.62 ± 0.05 | 1.66 ± 0.06 | 1.61 ± 0.04 | 1.83 ± 0.02 | 1.85 ± 0.04 |
| batch/70 wt % | 1.87 ± 0.10 | 2.08 ± 0.10 | NA | 2.05 ± 0.04 | 2.18 ± 0.03 |
| continuous/70 wt % | 2.19 ± 0.05 | NA | NA | 2.26 ± 0.02 | 2.34 ± 0.01 |
| batch/75 wt % | 2.26 ± 0.11 | 2.28 ± 0.12 | 2.34 ± 0.11 | 2.39 ± 0.04 | 2.59 ± 0.07 |
| batch/80 wt % | 2.45 ± 0.21 | 2.76 ± 0.16 | 2.68 ± 0.03 | 2.71 ± 0.03 | 2.99 ± 0.04 |
| continuous/80 wt % | 2.80 ± 0.06 | NA | NA | 2.79 ± 0.03 | 3.01 ± 0.03 |
| batch/85 wt % | 2.97 ± 0.06 | 2.94 ± 0.28 | NA | 3.03 ± 0.06 | 3.44 ± 0.03 |
| batch/90 wt % | 3.93 ± 0.08 | NA | NA | 3.94 ± 0.06 | 4.25 ± 0.04 |
| continuous/90 wt % | 3.67 ± 0.17 | NA | NA | 3.86 ± 0.07 | 4.14 ± 0.04 |

1. Formed at ≦ 0.17 MPa (25 psi) pressure.
2. Formed at ≦ 1.72 MPa (250 psi) pressure.
3. Sample not available.

2. Compressive Strength Testing

Compressive strength testing is a means of quantifying the mechanical integrity of a material. Force is exerted uniaxially on an unconstrained cylindrical sample until the sample fails. Compressive strength can also be useful to assess waste form performance following environmental testing. The Nuclear Regulatory Commission has recommended that licensable solidification processes must demonstrate a minimum waste form compressive strength of 0.41 MPa (60 psi). Hydraulic cement waste forms must exceed 3.45 MPa (500 psi) to be considered for licensing.

Eight to eleven DUPoly 2×4 waste forms at each DU loading were compression tested in accordance with ASTM D-695, "Standard Test Method for Compressive Properties of Rigid Plastics." Compressive testing was done using a Soiltest hydraulic compression tester at an unloaded crosshead deflection rate of 1.3±0.3 mm (0.05±0.01 in.)/min. Crosshead speed and total deflection were monitored using a dial gauge and lab timer. Load and deformation were recorded at 60 second intervals. Mean compressive yield strength and % deformation at yield are given in Table 4 for each of the DU types and waste loadings prepared.

TABLE 4

DUPoly Compression Test Results.

| DU type/wt % | Compressive Yield Strength (psi) | Compressive Yield Strength (MPa) | % Deformation at Yield |
|---|---|---|---|
| batch/50 wt %[1] | 2500 ± 222 | 17.2 + 1.53 | 25.8 ± 4.16 |
| batch/60 wt %[2] | 2280 + 119 | 15.7 ± 0.82 | 20.2 + 1.78 |
| batch/70 wt %[1] | 1940 ± 136 | 13.4 ± 0.94 | NA[3] |
| continuous/70 wt %[4] | 2420 ± 174 | 16.7 ± 1.20 | 19.2 ± 3.64 |
| batch/75 wt %[1] | 2190 ± 140 | 15.1 ± 0.97 | 16.1 ± 1.89 |
| batch/80 wt %[1] | 2290 ± 31.8 | 15.8 ± 0.22 | 13.6 ± 0.76 |
| continuous/80 wt %[4] | 2420 ± 101 | 16.7 ± 0.70 | 14.1 ± 1.22 |
| batch/85 wt %[4] | 2290 ± 122 | 15.8 ± 0.84 | NA[3] |
| batch/90 wt %[4] | 2940 ± 131 | 20.3 ± 0.90 | 6.6 ± 0.40 |
| continuous/90 wt %[5] | 2850 + 127 | 19.7 ± 0.88 | 7.1 ± 0.57 |

1. Mean ± 2 sigma error for eight replicate samples.
2. Mean ± 2 sigma error for eleven replicate samples.
3. Data not available.
4. Mean ± 2 sigma error for ten replicate samples.
5. Mean ± 2 sigma error for nine replicate samples.

3. Leachability Testing

DUPoly forms containing 50 wt %, 70 wt % and 90 wt % batch process $UO_3$ were tested in accordance with the Accelerated Leach Test (ALT), a ASTM Standard Method C1308, developed at Brookhaven National Laboratory. Samples of nominal 2.5 cm×2.5 cm (1×1) right cylinders were tested. The test procedure specified 13 leachant changes in distilled water over an 11 day period. Specimens were suspended by using monofilament line approximately into the center of each solution. Each series tested includes three (3) replicates of each sample.

Leachates were analyzed by inductively coupled plasma (ICP) spectroscopy for their total uranium metal concentration. Results of the metals analyses were evaluated using the ALT computer program which calculated the Incremental Fraction Leached (IFL), Cumulative Fraction Leached (CFL), and the diffusion coefficient that best fits the leaching data. Both incremental and cumulative leach fractions from the replicate samples are given in Table 5. Below each set of data is the calculated diffusion coefficient.

TABLE 5

Accelerated Leach Test Results for 50 wt %, 70 wt %, and 90 wt % Batch Process DUPoly.

50 WT % DUPoly; 25C

| Time | Incremental Fraction Leached | | | | Cumulative Fraction Leached | | | |
|---|---|---|---|---|---|---|---|---|
| (days) | sample 4 | sample 7 | sample 11 | mean IFL | sample 4 | sample 7 | sample 11 | mean CFL |
| 0.083 | 1.23e-05 | 1.60e-05 | 1.25e-05 | 1.36e-05 | 1.23e-05 | 1.60e-05 | 1.25e-05 | 1.36e-05 |
| 0.292 | 3.96e-05 | 4.61e-05 | 5.78e-05 | 4.78e-05 | 5.19e-05 | 6.22e-05 | 7.03e-05 | 6.14e-05 |
| 1.00 | 8.90e-05 | 8.82e-05 | 9.67e-05 | 9.13e-05 | 1.41e-04 | 1.50e-04 | 1.67e-04 | 1.53e-04 |
| 2.00 | 4.94e-05 | 5.81e-05 | 6.44e-05 | 5.73e-05 | 1.90e-04 | 2.08e-04 | 2.31e-04 | 2.10e-04 |
| 3.00 | 4.44e-05 | 4.29e-05 | 5.16e-05 | 4.63e-05 | 2.35e-04 | 2.51e-04 | 2.83e-04 | 2.56e"04 |
| 4.00 | 5.78e-05 | 6.09e-05 | 5.86e-05 | 5.91e-05 | 2.92e-04 | 3.12e-04 | 3.42e-04 | 3.15e-04 |
| 5.00 | 5.31e-05 | 5.73e-05 | 5.90e-05 | 5.64e-05 | 3.46e-04 | 3.70e-04 | 4.01e-04 | 3.72e-04 |
| 6.00 | 4.92e-05 | 4.66e-05 | 4.90e-05 | 4.83e-05 | 3.95e-04 | 4.16e-04 | 4.50e-04 | 4.20e-04 |
| 7.00 | 7.05e-05 | 6.90e-05 | 6.93e-05 | 6.96e-05 | 4.65e-04 | 4.85e-04 | 5.19e-04 | 4.90e-04 |
| 8.00 | 6.13e-05 | 6.29e-05 | 6.89e-05 | 6.44e-05 | 5.27e-04 | 5.48e-04 | 5.88e-04 | 5.54e-04 |
| 9.00 | 5.39e-05 | 5.83e-05 | 5.87e-05 | 5.70e-05 | 5.80e-04 | 6.06e-04 | 6.47e-04 | 6.11e-04 |
| 10.0 | 5.32e-05 | 5.25e-05 | 5.41e-05 | 5.33e-05 | 6.34e-04 | 6.59e-04 | 7.01e-04 | 6.64e-04 |
| 11.0 | 4.55e-05 | 5.25e-05 | 4.82e-05 | 4.87e-05 | 6.79e-04 | 7.11e-04 | 7.49e-04 | 7.13e-04 |

| | Diffusion Model | |
|---|---|---|
| | D (cm/sec) | Error (%) |
| sample 4 | 7.49e-14 | 3.77 |
| sample 7 | 8.27e-14 | 3.36 |
| sample 11 | 9.06e-14 | 2.62 |

70 WT % DUPoly; 25C

| Time | Incremental Fraction Leached | | | | Cumulative Fraction Leached | | | |
|---|---|---|---|---|---|---|---|---|
| (days) | sample 13 | sample 16 | sample 17 | mean IFL | sample 13 | sample 16 | sample 17 | mean CFL |
| 0.083 | 4.43e-05 | 3.80e-05 | 3.92e-05 | 4.05e-05 | 4.43e-05 | 3.80e-05 | 3.92e-05 | 4.05e-05 |
| 0.292 | 5.18e-05 | 3.72e-05 | 4.12e-05 | 4.34e-05 | 9.60e-05 | 7.53e-05 | 8.04e-05 | 8.39e-05 |
| 1.00 | 1.15e-04 | 8.13e-05 | 8.48e-05 | 9.38e-05 | 2.11e-04 | 1.57e-04 | 1.65e-04 | 1.78e-04 |
| 2.00 | 7.15e-05 | 6.73e-05 | 7.51e-05 | 7.13e-05 | 2.83e-04 | 2.24e-04 | 2.40e-04 | 2.49e-04 |
| 3.00 | 5.62e-05 | 5.36e-05 | 5.43e-05 | 5.47e-05 | 3.39e-04 | 2.77e-04 | 2.95e-04 | 3.04e-04 |
| 4.00 | 4.45e-05 | 5.92e-05 | 6.49e-05 | 5.62e-05 | 3.84e-04 | 3.37e-04 | 3.59e-04 | 3.60e-04 |
| 5.00 | 5.72e-05 | 5.34e-05 | 5.83e-05 | 5.63e-05 | 4.41e-04 | 3.90e-04 | 4.18e-04 | 4.16e-04 |
| 6.00 | 5.37e-05 | 4.80e-05 | 5.07e-05 | 5.08e-05 | 4.94e-04 | 4.38e-04 | 4.69e-04 | 4.67e-04 |
| 7.00 | 6.17e-05 | 5.59e-05 | 6.02e-05 | 5.93e-05 | 5.56e-04 | 4.94e-04 | 5.29e-04 | 5.26e-04 |
| 8.00 | 6.24e-05 | 5.90e-05 | 5.86e-05 | 6.00e-05 | 6.19e-04 | 5.53e-04 | 5.87e-04 | 5.86e-04 |
| 9.00 | 5.16e-05 | 4.99e-05 | 5.25e-05 | 5.13e-05 | 6.70e-04 | 6.03e-04 | 6.40e-04 | 6.38e-04 |
| 10.0 | 5.26e-05 | 5.34e-05 | 5.32e-05 | 5.31e-05 | 7.23e-04 | 6.56e-04 | 6.93e-04 | 6.91e-04 |
| 11.0 | 5.06e-05 | 4.56e-05 | 4.70e-05 | 4.77e-05 | 7.73e-04 | 7.02e-04 | 7.40e-04 | 7.38e-04 |

| | Diffusion Model | |
|---|---|---|
| | D (cm/sec) | Error (%) |
| sample 13 | 8.90e-14 | 1.47 |
| sample 16 | 7.77e-14 | 2.10 |
| sample 17 | 8.56e-14 | 1.84 |

90 WT % DUPoly; 25C

| Time | Incremental Fraction Leached | | | | Cumulative Fraction Leached | | | |
|---|---|---|---|---|---|---|---|---|
| (days) | sample 2 | sample 3 | sample 4 | mean IFL | sample 2 | sample 3 | sample 4 | mean CFL |
| 0.083 | 1.69e-04 | 1.69e-04 | 1.63e-04 | 1.67e-04 | 1.69e-04 | 1.69e-04 | 1.63e-04 | 1.67e-04 |
| 0.292 | 2.35e-04 | 3.10e-04 | 2.54e-04 | 2.66e-04 | 4.04e-04 | 4.79e-04 | 4.17e-04 | 4.33e-04 |
| 1.00 | 9.92e-04 | 1.07e-03 | 1.02e-03 | 1.03e-03 | 1.40e-03 | 1.55e-03 | 1.43e-03 | 1.46e-03 |
| 2.00 | 1.15e-03 | 1.27e-03 | 1.25e-03 | 1.22e-03 | 2.54e-03 | 2.82e-03 | 2.68e-03 | 2.68e-03 |
| 3.00 | 9.01e-04 | 1.09e-03 | 1.09e-03 | 1.03e-03 | 3.44e-03 | 3.92e-03 | 3.77e-03 | 3.71e-03 |
| 4.00 | 7.43e-04 | 8.47e-04 | 8.28e-04 | 8.06e-04 | 4.18e-03 | 4.76e-03 | 4.59e-03 | 4.51e-03 |
| 5.00 | 9.66e-04 | 1.06e-03 | 1.06e-03 | 1.03e-03 | 5.15e-03 | 5.82e-03 | 5.66e-03 | 5.54e-03 |
| 6.00 | 9.52e-04 | 1.11e-03 | 1.03e-03 | 1.03e-03 | 6.10e-03 | 6.93e-03 | 6.69e-03 | 6.57e-03 |
| 7.00 | 8.34e-04 | 9.49e-04 | 9.01e-04 | 8.95e-04 | 6.94e-03 | 7.88e-03 | 7.59e-03 | 7.47e-03 |
| 8.00 | 8.83e-04 | 1.03e-03 | 9.05e-04 | 9.39e-04 | 7.82e-03 | 8.91e-03 | 8.49e-03 | 8.41e-03 |
| 9.00 | 9.35e-04 | 1.08e-03 | 9.86e-04 | 1.00e-03 | 8.75e-03 | 9.99e-03 | 9.48e-03 | 9.41e-03 |

TABLE 5-continued

| Accelerated Leach Test Results for 50 wt %, 70 wt %, and 90 wt % Batch Process DUPoly. | | | | | | | | |
|---|---|---|---|---|---|---|---|---|
| 10.0 | 9.59e−04 | 1.05e−03 | 8.90e−04 | 9.67e−04 | 9.71e−03 | 1.10e−02 | 1.04e−02 | 1.04e−02 |
| 11.0 | 8.72e−04 | 9.45e−04 | 8.48e−04 | 8.88e−04 | 1.06e−02 | 1.20e−02 | 1.12e−02 | 1.13e−02 |

| | Diffusion Model | |
|---|---|---|
| | D (cm/sec) | Error (%) |
| sample 2 | 2.15e−11 | 4.49 |
| sample 3 | 2.46e−11 | 4.56 |
| sample 4 | 2.26e−11 | 3.86 |

4. Immersion Testing

Water immersion testing was performed using one 2×4 and one 1×1 form of each DU type and waste loading. Samples were immersed in distilled water to determine possible deleterious effects of a water saturated environment. Three or four similar samples were grouped together in a single polyethylene container, with a water/sample ratio of 1000 ml per sample for 2×4 forms and 200 ml per sample for 1×1 forms. The test, done at ambient temperature, was a 90 day static immersion after which time the sample weights and volumes were re-measured. Samples remaining intact on completion of the test were compression tested to determine whether non-visible degradation had occurred.

After 90 days, visible degradation was only evident on samples containing 85 wt % and 90 wt % batch process DU (BPDU). Samples containing 80 wt % or less batch process DU were visibly unchanged, as were all samples containing continuous process DUU (CPDU), up to 90 wt %. The 90 wt % BPDU samples began showing signs of cracking around the top and bottom perimeter within the first week of immersion. Cracks in the 85 wt % BPDU samples were not noticed until the third month of the test. Cracking at both top and bottom surfaces resulted in creation of a solid cone at either end of the samples. After 90 days, 85 wt % BPDU samples contained only three or four minor cracks of less than 1 cm along the sample sides. Immersion solutions for batch process DUPoly samples were bright yellow in color, in contrast to continuous process DUPoly immersion solutions which were much more pale with a slight brownish tint.

Post-immersion compressive strengths of 50 wt %, 60 wt %, 70 wt %, 75 wt %, 80 wt % and 85 wt % BPDU samples were 2450 psi, 2460 psi, 1390 psi, 2390 psi, 1980 psi, and 1340 psi (16.9, 17.0, 9.6, 16.5, 13.6, and 9.2 MPa), respectively. Post-immersion compressive strengths of 70 wt %, 80 wt % and 90 wt % CPDU samples were 2680 psi, 2440 psi, and 2640 psi (18.5, 16.8, and 18.2 MPa), respectively. Percent changes in sample mass, volume and compressive strength due to 90 day water immersion are shown in Table 6 below.

TABLE 6

DUPoly Immersion Test Results.

| DU type/wt % | Percent Change in Sample Mass[1] | Percent Change Sample in Volume[1] | Percent Change in Compressive Yield Strength[2] |
|---|---|---|---|
| batch/50 wt % | +0.6, +0.2 | −1.2, +0:3 | −1.9 |
| batch/60 wt % | +0.5, +0.2 | +0.5, +0.0 | +7.8 |
| batch/70 wt % | +0.6, +0.3 | +1.2, −0.4 | −28.5 |

TABLE 6-continued

DUPoly Immersion Test Results.

| DU type/wt % | Percent Change in Sample Mass[1] | Percent Change Sample in Volume[1] | Percent Change in Compressive Yield Strength[2] |
|---|---|---|---|
| batch/75 wt % | +1.0, +0.5 | +3.8, +1.5 | +9.1 |
| batch/80 wt % | +1.9, +1.8 | +5.6, +3.9 | −13.6 |
| batch/85 wt % | +4.6, +5.4 | +14.7, +10.8 | −41.6 |
| batch/90 wt % | ND[3], +11.0 | ND, ND | ND |
| continuous/50 wt % | ND, +0.1 | ND, −1.8 | ND |
| continuous/60 wt % | ND, +0.1 | ND, −3.2 | ND |
| continuous/70 wt % | +0.2, +0.1 | −0.9, −0.2 | +10.8 |
| continuous/80 wt % | +0.3, +0.2 | −0., +0.4 | +0.8 |
| continuous/90 wt % | +1.1, +0.5 | +1.2, +0.2 | −7.2 |

[1]First value is for 1 × 1 sample; second value is for 2 × 4 sample.
[2]Compressive strengths measured for 2 × 4 samples only.
[3]ND = No Data (sample not measured).

Figure 9:
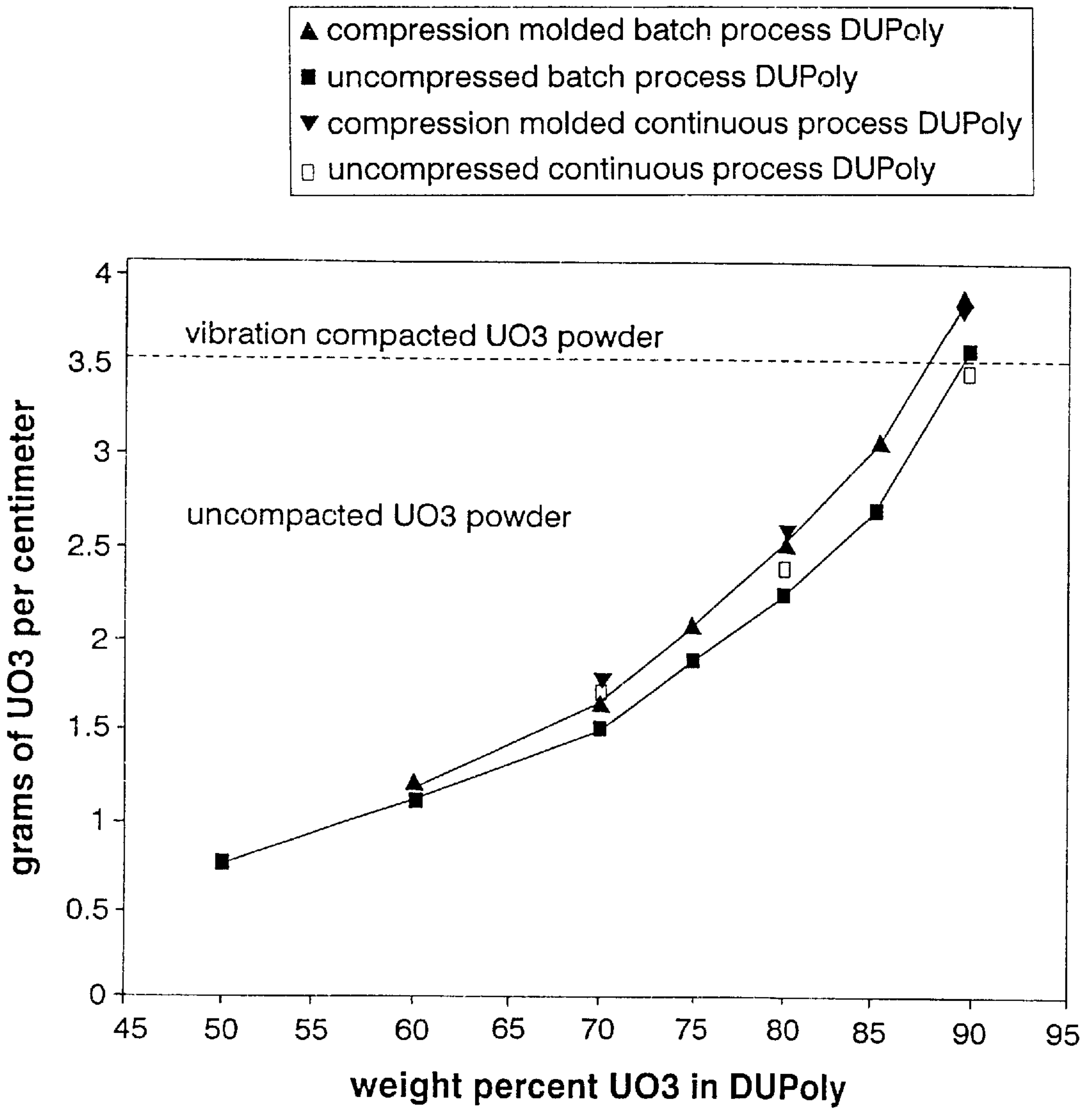
FIG. 9 shows DUPoly density versus DU loading for samples prepared from $UO_3$.

Product density is the most characteristic difference between samples of different DU loadings. DUPoly densities ranged from 1.38 to 3.93 g/cm$^3$ for uncompressed samples (disk, 2×4, and uncompressed 1×1 forms) for the range of about 50 wt % to about 90 wt % DU. Disk samples and 2×4 samples, although formed under compression, have relatively large surface areas and thus were formed under low pressure (<0.17 MPa (25 psi)), so that density values were very similar to uncompressed samples. Compressed 1×1 (ALT) forms, on the other hand, had densities which were consistently and significantly higher than those of other samples. Because of their relatively small size, these samples were compressed with up to 1.72 MPa (250 psi) pressure. The density increase observed by compressing these forms was approximately 10–15%, with mean values ranging from 1.62 to 4.25 g/cm$^3$ for compressed forms at about 50 wt % to about 90 wt % DU. DU density as a function of wt % DU loading is depicted in FIG. 9 for both compressed and uncompressed samples.

DUPoly process runs using batch and continuous process DU produced nearly identical values for compressed forms, whereas uncompressed sample densities differed somewhat from the corresponding batch process samples. This was probably an artifact of sample formation, allowing fewer or more voids while filling the molds, or using slightly more or less pressure during cooling. For both batch and continuous process DUPoly, DU densities for 90 wt % samples were higher than the reported density of a vibration compacted sample of the dry powder (3.5 g/cm$^3$). Uncompacted DU powder, which has a density of about 2.5 g/cm$^3$, was surpassed at about 80 wt % DUPoly for compressed samples and about 85 wt % for uncompressed DUPoly. In other words, at these waste loadings, the DUPoly process represents a volume reduction compared with disposal of a comparable quantity of untreated DU.

To quantify how much DU is in a drum of DUPoly compared to a drum of treated or untreated DU, the grams DU per cubic centimeter DUPoly were divided by the grams DU per cubic centimeter in the form or container for the material to which it is being compared. Thus, for the highest density DUPoly forms achieved in these tests (90 wt % DU, compression molded forms), DU loadings were 1.08 times greater than vibration compacted DU powder, and 1.49 times greater than uncompacted DU powder. Ratios greater than 1 indicate that there is more DU in a DUPoly form than in the referenced material (DU powder) of an equivalent volume. To illustrate this point on a constant weight basis, the estimated volume for 1000 kg of DU stabilized in 90 wt % DUPoly would be 0.26 $m^3$, compared to a volume of 0.40 $m^3$ for uncompacted DU powder or 0.29 $m^3$ for vibration compacted DU powder. Such high product densities are achieved because of an increased volume packing efficiency for the DU particles during DUPoly processing. This effect may be attributed to one or more of the following factors: reduced particle agglomeration due to drying of the particles during thermal treatment; comminution of the particles due to mechanical abrasion during processing; or increased packing efficiency due to compressive forces exerted during forming.

Figure 10:
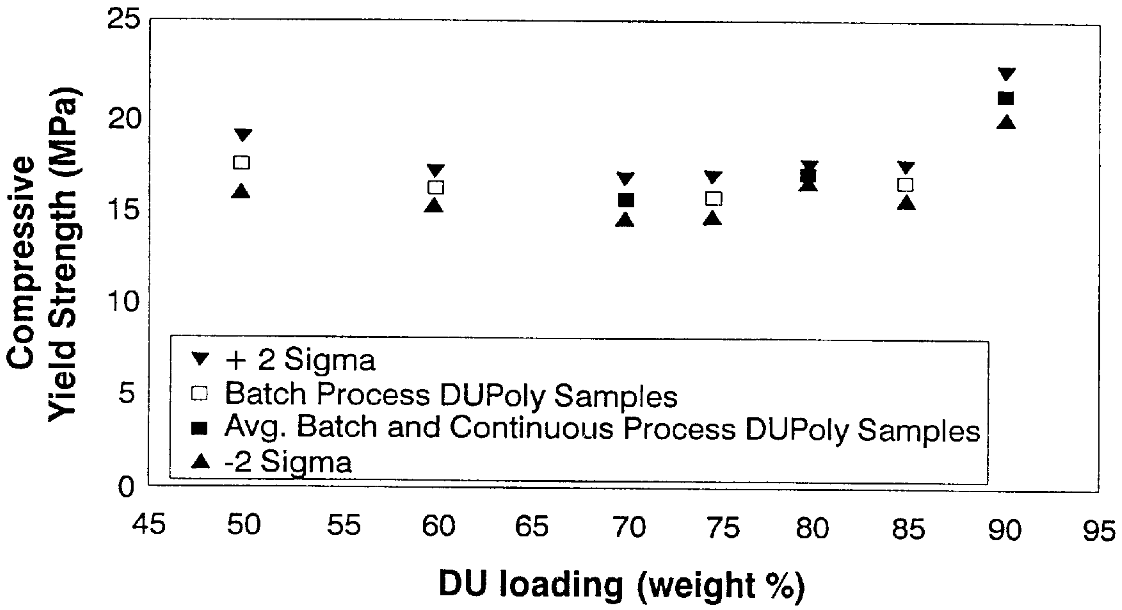
FIG. 10 illustrates compressive yield strength versus DU loading.

Compressive yield strength is plotted against DU loading as shown in FIG. 10. With batch and continuous process DUPoly data averaged together as shown in filled squares, maximum yield strength is relatively constant between 50 wt % and 85 wt % DU considering the range of measurement error. At 90 wt %, a statistically significant increase was noted, probably due to particle-to-particle contact of the DU in the matrix, with barely enough polyethylene present to fill void spaces. This fact is reflected in the percent deformation at yield, reduced from approximately 26% for 50 wt % DUPoly samples to only 7% for 90 wt % DUPoly samples.

Figure 11:
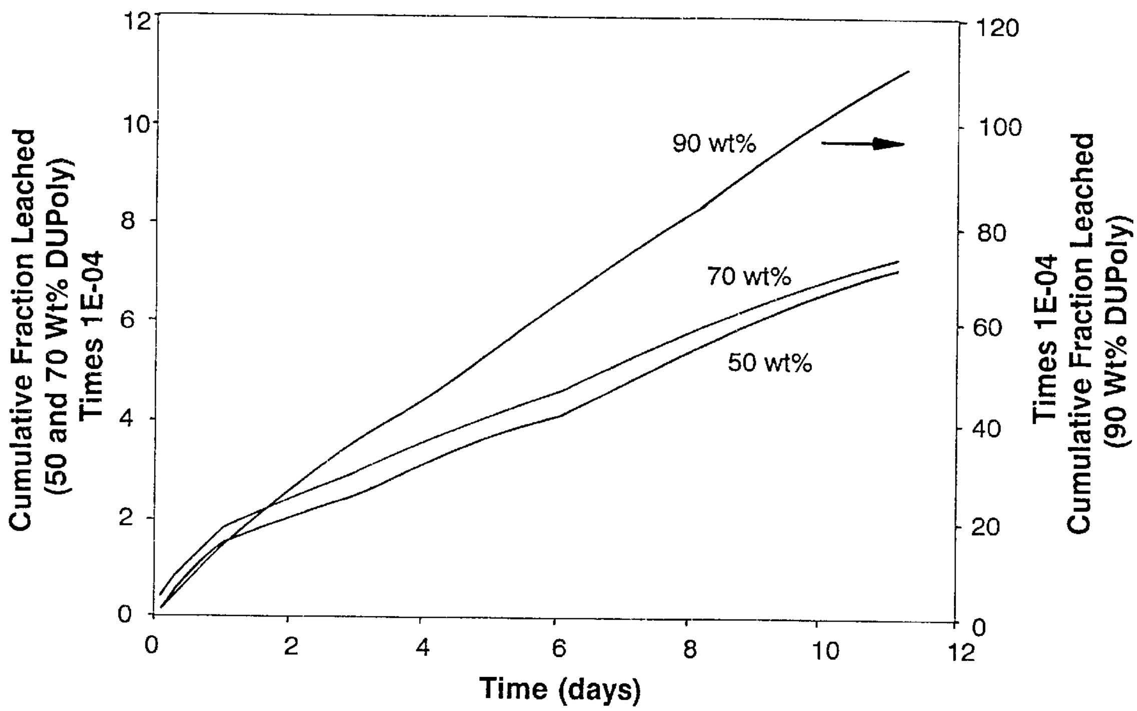
FIG. 11 illustrates Accelerated Leach Test (ALT) results for batch process DUPoly samples.

Accelerated Leach Testing of batch process DUPoly forms produced cumulative uranium releases of approximately 1.1% for 90 wt % DU and approximately 0.07% for both 50 and 70 wt % DU samples, after 12 days as shown in FIG. 11. These results were typical for waste materials microencapsulated in polyethylene. However, assuming that uranium trioxide should be insoluble in water, these data indicated the probable presence of other, more soluble uranium compounds. While the $UO_3$ was reportedly 96.5% pure (82.25–78.47% total U), it is likely that other soluble uranium salts were present and unaccounted for in the DU. These unaccounted salts were not identified. The high solubility of the as-received batch DU was further evidenced in that a source term leach sample of 50 g batch process DU in 3000 ml water saturated within the first two hour leach interval. Continuous process DUPoly samples were not tested.

Ninety day water immersion tests indicated that water absorption was inconsequential except for batch process DU samples at very high (>85 wt %) waste loadings. Swelling and cracking in batch process DUPoly samples were probably related to the same phenomenon observed in leach testing, i.e., presence of soluble compounds. In contrast, DUPoly produced from continuous process DU showed little evidence of leaching or swelling/cracking during a ninety (90) day immersion testing even at the highest waste loading of 90 wt %. Therefore, continuous process DU provides a more stable and durable product at high loadings, all in the absence of any precipitating anti-leaching additives to DU samples of the resulting homogenous mixture with non-degradable thermoplastic polymer polyethylene.

The above examples provide experimental data on bench-scale extrusion and preliminary characterization of polyethylene encapsulated depleted uranium (DU). Extrusion process runs were conducted over the range from about 50 wt % to about 95 wt % DU using both batch process and continuous process depleted $UO_3$ obtained from the Savannah River Site. Processing using a non-vented extruder required pretreatment drying to guarantee uniform and reproducible process results, despite the relatively low as-received moisture contents of the powders (0.4–1.6 wt %). In these tests, DU was oven dried at 160° C., equivalent to the maximum process temperature, for a period of at least 18 hours. Moisture problems can typically be circumvented using a vented extrusion process or a therniokinetic mixer, whereby small amounts of entrained gases are removed before the molten material is discharged.

Process runs at 50 wt % to 75 wt % DU produced extrudate which appeared dense and relatively fluid, with an obvious plastic appearance and characteristic, i.e., flowed in a continuous stream. Runs at 80 wt % and higher were more viscous and produced increasingly rough extrudate surfaces, an observable indication that the plastic to DU ratio is lessening. Despite this appearance, even at 90 wt %. the material processed continuously and the process continued to successfully encapsulate the DU powder particles.

DUPoly product density increased significantly as a function of DU loading and sample compression during molding. Mean densities ranged from 1.38 g/$cm^3$ at 50 wt % DU to 4.25 g/$cm^3$ at 90 wt % DU. Density was increased approximately 10% to 15% by cooling the molds under compression. Potential improvements in product density are possible by using larger compressive forces or $UO_2$ or $U_3O_8$ powders and/or sintered uranium oxide as an aggregate addition to the microencapsulated powder.

Mean compressive strength was consistently high for all samples, namely, approximately 13.8 MPa (2000 psi) or greater for all samples. Within statistical error, the trend was flat with exception of 90 wt % DUPoly samples which were slightly higher, probably due to particle-to-particle contact of the DU in the matrix. Percent deformation at yield was noticeably different between waste loadings, with 90 wt % DU samples reaching their maximum strength at about 7% deformation, compared to approximately 26% deformation for 50 wt % DUPoly samples. All forms easily surpass the minimum 0.41 MPa (60 psi) compressive strength recommended by NRC for waste form burial.

Leachability and water immersion testing indicated similar trends in that results were sensitive to both waste loading and type of $UO_3$ processed. Ninety wt % batch process DUPoly leaches and degrades significantly faster than comparably loaded continuous process DUPoly or batch process DUPoly with lower waste loadings. In ALT tests, the leach rate for 90 wt % batch process DUPoly samples was approximately 15 times higher than for 50 wt % or 70 wt % samples. Similarly, swelling and cracking of immersion samples was observed for batch process DU samples only at very high (>85 wt %) waste loadings. In contrast, continuous process DU showed little evidence of leaching or swelling/cracking during 90 day immersion testing even at the highest waste loading of 90 wt %. Leaching and swelling/cracking in batch process DU are probably related to the same phenomenon, i.e., presence of soluble compounds, although no effort was made to investigate the chemical differences in the two sources.

Product density improvements are achievable using alternative DU materials and/or process enhancements. Uranium oxide crystal and bulk powder densities were the limiting parameters in achieving maximum product density and shielding performance. For example, a maximum product density of 6.1 g/cm$^3$ was estimated using $UO_2$ powder as opposed to $UO_3$ powder. Additional product density improvements up to about 7.2 /cm$^3$ were estimated using $UO_2$ in a hybrid technique known as micro/macroencapsulation. The micro/macro DU processing alternative has the potential for incorporating the greatest volume of DU compared to all other alternatives.

We claim:

1. A process of encapsulating depleted uranium powder selected from the group consisting of $UO_3$, $UO_2$, $U_3O_8$, $UF_4$ and mixtures thereof, which process comprises forming a homogenous mixture of said depleted uranium powder and molten virgin or recycled thermoplastic polymer by combining separate streams of said depleted uranium powder and said virgin or recycled thermoplastic polymer and subjecting said combination simultaneously to heating and mixing conditions.

2. The process of claim 1, wherein said depleted uranium powder is provided by a batch evaporation process.

3. The process of claim 2, wherein said depleted uranium powder is added in an amount from about 50 wt % to about 90 wt %.

4. The process of claim 1, wherein said depleted uranium powder is provided by a continuous evaporation process.

5. The process of claim 3, wherein said depleted uranium powder is added in an amount from about 75 wt % to about 90 wt %.

6. The process of claim 1, wherein said virgin or recycled thermoplastic polymer is selected from the group consisting of virgin or recycled polyethylene, virgin or recycled polypropylene, virgin or recycled LDPE, virgin or recycled LLDPE, virgin or recycled HDPE and mixtures thereof.

7. The process according to claim 1, wherein said heating and mixing conditions are provided by a thermokinetic mixer.

8. The process according to claim 1, wherein said heating and mixing conditions are provided by an extruder.

9. The process according to claim 1, wherein said heating and mixing conditions are provided by a continuous mixer.

10. The process according to claim 7, further comprising feeding said homogenous molten mixture from said thermokinetic mixer into an extruder.

11. The process according to claim 9, further comprising feeding said homogenous molten mixture from said continuous mixer into an extruder.

12. The process according to claim 1, further comprising adding depleted uranium aggregates to said homogenous mixture of depleted uranium powder and molten virgin or recycled thermoplastic polymer.

13. The process according to claim 12, wherein said depleted uranium aggregates are obtained by pelletization and sintering of depleted uranium powder.

14. The process according to claim 12, wherein said depleted uranium aggregates are pelletized depleted uranium powder.

15. The process according to claim 1, further comprising molding said homogenous molten mixture into desired shapes.

16. The process of claim 15, wherein said shapes are counterweights for use in airplanes, helicopters, ships, missiles, armor or projectiles.

17. The process of claim 15, wherein said shapes are panels.

18. The process according to claim 17, wherein said panels are assembled to form a radiation shielded container suitable for storage, transport or disposal of low-level radioactive wastes or mixed wastes.

19. The process according to claim 15, wherein said molding is accomplished by compression, injection or rotational molding.

20. The process according to claim 15, wherein said shapes are shielding material for incorporation in nuclear spent fuel storage, transport or disposal casks.

21. A process for preparing shielding material for shielding alpha, beta, gamma or neutron radiation which comprises providing a radiation shield made of encapsulated depleted uranium powder prepared according to claim 1.

22. A composition of converted $UF_6$ resulting from making nuclear fuel, comprising a conversion product of residual $UF_6$ resulting from an enrichment process in the making of nuclear fuel, said conversion product selected from the group consisting of $UO_3$, $UO_2$, $U_3O_8$, $UF_4$ and mixtures thereof, homogeneously dispersed in a continuum of a virgin or recycled thermoplastic polymer, and further comprising aggregates of depleted uranium.

23. The composition of claim 22, wherein said conversion product is present in an amount from about 50 wt % to about 90 wt %.

24. The composition of claim 22, wherein said thermoplastic polymer is low density polyethylene.

25. A shielding material comprising a conversion product of residual $UF_6$ resulting from an enrichment process in the making of nuclear fuel, said conversion product selected from the group consisting $UO_3$, $UO_2$, $U_3O_8$, $UF_4$ and mixtures thereof, homogeneously dispersed in a continuum of a virgin or recycled thermoplastic polymer, having thickness of at least one inch, wherein said conversion product is present in an amount from about 50 wt % to about 90 wt %.

26. The shielding material of claim 25, further comprising aggregates of depleted uranium.

27. The shielding material of claim 25, wherein said thermoplastic polymer is low density polymethylene.

* * * * *